US012572809B2

(12) United States Patent
Valois et al.

(10) Patent No.: US 12,572,809 B2
(45) Date of Patent: Mar. 10, 2026

(54) GENERATING LABELED TRAINING INSTANCES FOR AUTONOMOUS VEHICLES USING TEMPORALLY CORRELATED TIMESTAMPS

(71) Applicant: Aurora Operations, Inc., Mountain View, CA (US)

(72) Inventors: Jean-Sebastien Valois, Pittsburgh, PA (US); Thomas Pilarski, Gibsonia, PA (US); Daniel Munoz, San Francisco, CA (US)

(73) Assignee: Aurora Operations, Inc., Mountain View, CA (US)

( * ) Notice: Subject to any disclaimer, the term of this patent is extended or adjusted under 35 U.S.C. 154(b) by 677 days.

(21) Appl. No.: 17/713,782

(22) Filed: Apr. 5, 2022

(65) Prior Publication Data

US 2022/0230026 A1　　Jul. 21, 2022

Related U.S. Application Data

(63) Continuation of application No. 16/816,942, filed on Mar. 12, 2020, now Pat. No. 11,403,492, which is a
(Continued)

(51) Int. Cl.
*G06N 3/084*　　　(2023.01)
*B60W 60/00*　　　(2020.01)
(Continued)

(52) U.S. Cl.
CPC ......... *G06N 3/084* (2013.01); *B60W 60/0025* (2020.02); *B60W 60/00276* (2020.02);
(Continued)

(58) Field of Classification Search
None
See application file for complete search history.

(56) References Cited

U.S. PATENT DOCUMENTS 3,987,297 A　　10/1976　Brienza et al.
6,175,799 B1　　1/2001　Tsutsumi et al.
(Continued)

FOREIGN PATENT DOCUMENTS

EP　　　1298454　　　4/2003
EP　　　1531343　　　5/2005
(Continued)

OTHER PUBLICATIONS

United States Patent and Trademark Office, Office Action for U.S. Appl. No. 16/271,628 dated Jan. 19, 2021.
(Continued)

*Primary Examiner* — James J Lee
*Assistant Examiner* — Tawri M McAndrews
(74) *Attorney, Agent, or Firm* — Gray Ice Higdon

(57) ABSTRACT

In techniques disclosed herein, machine learning models can be utilized in the control of autonomous vehicle(s), where the machine learning models are trained using automatically generated training instances. In some such implementations, a label corresponding to an object in a labeled instance of training data can be mapped to the corresponding instance of unlabeled training data. For example, an instance of sensor data can be captured using one or more sensors of a first sensor suite of a first vehicle can be labeled. The label(s) can be mapped to an instance of data captured using one or more sensors of a second sensor suite of a second vehicle.

18 Claims, 15 Drawing Sheets

Related U.S. Application Data continuation-in-part of application No. 16/271,628, filed on Feb. 8, 2019, now Pat. No. 11,256,263.

(60) Provisional application No. 62/755,190, filed on Nov. 2, 2018.

(51) Int. Cl.

| | |
|---|---|
| *G05D 1/00* | (2024.01) |
| *G06F 18/214* | (2023.01) |
| *G06V 10/764* | (2022.01) |
| *G06V 10/82* | (2022.01) |
| *G06V 20/56* | (2022.01) |

(52) U.S. Cl.

CPC ....... *G05D 1/0094* (2013.01); *G06F 18/2155* (2023.01); *G06V 10/764* (2022.01); *G06V 10/82* (2022.01); *G06V 20/56* (2022.01)

(56) References Cited

U.S. PATENT DOCUMENTS

| | | |
|---|---|---|
| 8,849,494 B1 | 9/2014 | Herbach et al. |
| 8,849,557 B1 | 9/2014 | Levandowski |
| 9,020,680 B2 | 4/2015 | Solyom et al. |
| 9,606,539 B1 | 3/2017 | Kentley et al. |
| 9,658,620 B1 | 5/2017 | Urmson et al. |
| 9,734,455 B2 | 8/2017 | Levinson et al. |
| 9,940,834 B1 | 4/2018 | Konrardy et al. |
| 9,947,224 B2 | 4/2018 | Fairfield et al. |
| 10,007,269 B1 | 6/2018 | Gray |
| 10,037,613 B1 | 7/2018 | Becker et al. |
| 10,216,189 B1 | 2/2019 | Haynes |
| 10,514,462 B2 | 12/2019 | England et al. |
| 10,558,224 B1 | 2/2020 | Lin et al. |
| 10,676,085 B2 | 6/2020 | Smith et al. |
| 10,915,101 B2 | 2/2021 | Cohen |
| 11,086,319 B2 | 8/2021 | Valois |
| 11,256,263 B2 | 2/2022 | Valois |
| 2007/0219720 A1 | 9/2007 | Trepagnier et al. |
| 2010/0052945 A1 | 3/2010 | Breed |
| 2010/0198513 A1 | 8/2010 | Zeng et al. |
| 2012/0153087 A1 | 6/2012 | Collette et al. |
| 2013/0190982 A1 | 7/2013 | Nakano et al. |
| 2014/0324266 A1 | 10/2014 | Zhu et al. |
| 2014/0350768 A1 | 11/2014 | Filippov et al. |
| 2014/0368493 A1 | 12/2014 | Rogan et al. |
| 2015/0112550 A1 | 4/2015 | Cho et al. |
| 2016/0299228 A1 | 10/2016 | Maleki et al. |
| 2017/0016870 A1 | 1/2017 | McPeek |
| 2017/0076227 A1 | 3/2017 | Elgie et al. |
| 2017/0123419 A1 | 5/2017 | Levinson et al. |
| 2017/0270361 A1 | 9/2017 | Puttagunta et al. |
| 2018/0031678 A1 | 2/2018 | Singer et al. |
| 2018/0053102 A1 | 2/2018 | Martinson et al. |
| 2018/0060725 A1 | 3/2018 | Groh et al. |
| 2018/0068206 A1* | 3/2018 | Pollach .................. G06V 20/56 |
| 2018/0089538 A1 | 3/2018 | Graham et al. |
| 2018/0113210 A1 | 4/2018 | Izadian |
| 2018/0136332 A1 | 5/2018 | Barfield |
| 2018/0136644 A1 | 5/2018 | Levinson et al. |
| 2018/0188032 A1 | 7/2018 | Ramanandan et al. |
| 2018/0188037 A1 | 7/2018 | Wheeler et al. |
| 2018/0188736 A1 | 7/2018 | Jian et al. |
| 2018/0196127 A1 | 7/2018 | Harada |
| 2018/0217595 A1 | 8/2018 | Kwon |
| 2018/0225970 A1 | 8/2018 | Mitra et al. |
| 2018/0260628 A1 | 9/2018 | Namiki et al. |
| 2018/0306609 A1 | 10/2018 | Agarwal |
| 2018/0307944 A1 | 10/2018 | Li et al. |
| 2018/0314921 A1* | 11/2018 | Mercep .................. G01S 15/86 |
| 2019/0004525 A1 | 1/2019 | Bills |
| 2019/0012907 A1 | 1/2019 | Itahara |
| 2019/0018423 A1 | 1/2019 | Lee |
| 2019/0049970 A1* | 2/2019 | Djuric .................... G06N 20/00 |

| | | |
|---|---|---|
| 2019/0064811 A1 | 2/2019 | Du |
| 2019/0147610 A1 | 5/2019 | Frossard |
| 2019/0164049 A1 | 5/2019 | Bai et al. |
| 2019/0180451 A1 | 6/2019 | Kellner |
| 2019/0205659 A1 | 7/2019 | Cuban et al. |
| 2019/0220011 A1 | 7/2019 | Della Penna |
| 2019/0258251 A1 | 8/2019 | Ditty |
| 2019/0266264 A1 | 8/2019 | Michalakis et al. |
| 2019/0302269 A1 | 10/2019 | Singer et al. |
| 2019/0315351 A1 | 10/2019 | Smith et al. |
| 2019/0317217 A1 | 10/2019 | Day et al. |
| 2019/0317219 A1 | 10/2019 | Smith et al. |
| 2019/0318206 A1 | 10/2019 | Smith et al. |
| 2019/0354782 A1 | 11/2019 | Kee |
| 2020/0074862 A1 | 3/2020 | Johnston |
| 2020/0118359 A1 | 4/2020 | Sato |
| 2020/0125845 A1 | 4/2020 | Hess et al. |
| 2020/0133288 A1 | 4/2020 | Abari et al. |
| 2020/0142408 A1 | 5/2020 | Valois et al. |
| 2020/0142409 A1 | 5/2020 | Valois et al. |
| 2020/0142422 A1 | 5/2020 | Valois et al. |
| 2020/0174493 A1* | 6/2020 | Lin ...................... G05D 1/0088 |
| 2020/0209867 A1 | 7/2020 | Valois et al. |
| 2020/0222010 A1 | 7/2020 | Howard |
| 2020/0307563 A1* | 10/2020 | Ghafarianzadeh ..... G06V 40/25 |
| 2020/0391736 A1 | 12/2020 | Smith et al. |

FOREIGN PATENT DOCUMENTS

| | | |
|---|---|---|
| EP | 3285230 | 2/2018 |
| EP | 3477616 A1 | 5/2019 |
| WO | 2014168851 | 10/2014 |
| WO | 2018055378 | 3/2018 |
| WO | 2019199473 | 10/2019 |
| WO | 2019199474 | 10/2019 |
| WO | 2019199475 | 10/2019 |
| WO | 2020091833 | 5/2020 |
| WO | 2020091834 | 5/2020 |
| WO | 2020091835 | 5/2020 |

OTHER PUBLICATIONS

Khuon, Timothy et al.: "Distributed adaptive spectral and spatial sensor fusion for super-resolution classification", Applied Imagery Pattern Recognition Workshop (AIPR), 2012 IEEE, IEEE, pp. 1-8, XP032422650; dated Oct. 9, 2012.

United States Patent and Trademark Office, Office Action for U.S. Appl. No. 16/173,660 dated Jun. 24, 2020.

United States Patent and Trademark Office, Notice of Allowance for U.S. Appl. No. 16/173,660 dated Oct. 15, 2020.

United States Patent and Trademark Office, Office Action for U.S. Appl. No. 16/271,401 dated Nov. 27, 2020.

United States Patent and Trademark Office, Notice of Allowance for U.S. Appl. No. 16/173,660 dated Nov. 27, 2020.

Chinese Application No. 201980024172.3 entered national stage Sep. 30, 2020.

Chinese Application No. 201980024410.0 entered national stage Sep. 30, 2020.

Korean Patent App. No. "10-2020-7031846" entered national stage Nov. 4, 2020.

Korean Patent App. No. "10-2020-7031853" entered national stage Nov. 4, 2020.

European Patent App. No. 19744897.0 entered national stage Nov. 9, 2020.

European Patent App. No. 19722966.9 entered national stage Nov. 9, 2020.

Japanese Patent App. No. 2020-555890 entered national stage Oct. 7, 2020.

United States Patent and Trademark Office, Advisory Action for U.S. Appl. No. 16/271,628 dated Sep. 30, 2021.

United States Patent and Trademark Office, Office Action for U.S. Appl. No. 16/869,438 dated Oct. 7, 2021.

United States Patent and Trademark Office, Notice of Allowance for U.S. Appl. No. 16/271,628 dated Oct. 26, 2021.

(56) References Cited

OTHER PUBLICATIONS

United States Patent and Trademark Office, Notice of Allowance for U.S. Appl. No. 16/869,438 dated Feb. 7, 2022.

Dresner, et al.; A Multiagent Approach to Autonomous Intersection Management, Journal of Artificial Intelligence Research 31 (2008) 591-656, Mar. 2008.

Cortica Automotive; It's Not Enough to Recognize a Traffic Light 99% of the Time, http://www.cortica.com/automotive/index.html, Jun. 5, 2018.

Bojarski, et al.; End to End Learning for Self-Driving Cars, Apr. 25, 2016.

Michels, Jeff, et al.; High Speed Obstacle Avoidance using Monocular Vision and Reinforcement Learning, Computer Science Department, Stanford University, Proceedings of the 22nd International Conference on Machine Learning, Bonn, Germany, 2005.

Dresner, Kurt, et al.; Stone P. (2006) Multiagent Traffic Management: Opportunities for Multiagent Learning. In: Tuyls K., Hoen P.J., Verbeeck K., Sen S. (eds) Learning and Adaption in Multi-Agent Systems. LAMAS 2005. Lecture Notes in Computer Science, vol. 3898. Springer, Berlin, Heidelberg.

Pongpunwattana, Anawat, et al.; (2004). Real-Time Planning for Multiple Autonomous Vehicles in Dynamic Uncertain Environments. Journal of Aerospace Computing Information and Communication—J Aerosp Comput Inf Commun. 1. 580-604. 10.2514/1. 12919.

Roderick, Norman, et al. (2002); Reinforcement Learning for Autonomous Vehicles.

International Searching Authority; Search Report and Written Opinion for PCT Application No. PCT/US2019/024949; 12 pages; dated Jul. 8, 2019.

Desjardins, C. et al.; Cooperative Adaptive Cruise Control: A Reinforcement Learning Approach; IEEEE, vol. 12, No. 4; pp. 1248-1260; dated Dec. 2011.

Ye, H. et al.: Machine LEarning for Vehicular Networks: Recent Advances and Application Examples; IEEE, vol. 13, No. 2; pp. 94-101; dated Jun. 1, 2018.

Barth, Alexander et al.; Where Will the Oncoming Vehicle be the Next Second? 2008 IEEE Intelligent Vehicles Symposium, Eindhoven University of Technology, Eindhoven, the Netherlands, Jun. 4-6, 2008, 6 pages, Downloaded on Jun. 18, 2010.

Carlson, Christopher R., et al.; Practical Position and Yaw Rate Estimation with GPS and Differential Wheelspeeds, Mechanical Engineering, Standford, CA, 8 pages, Oct. 30, 2014.

Kellner, Dominik, et al.; Instantaneous Full-Motion Estimation of Arbitrary Objects using Dual Doppler Radar, driveU, Institute of Measurement, Control and Microtechnology Ulm, Germany, 6 pages, Jun. 29, 2016.

Kellner, Dominik, et al.; Tracking of Extended Objects with High-Resolution Doppler Radar, driveU, Institute of Measurement, Control and Microtechnology Ulm, Germany, 13 pages, Nov. 23, 2015.

Mukhtar, Amir, et al.; Vehicle Detection Techniques for Collision Avoidance Systems: A Review, IEEE Transactions on Intelligent Transportation Systems, vol. 16, No. 5, 21 pages, Oct. 2015.

United States Patent and Trademark Office, Office Action for U.S. Appl. No. 16/173,669 dated Jan. 14, 2020.

A Multi-Sensor Acquisition Architecture and Real-Time Reference for Sensor and Fusion Methods Benchmarking; M. Kais et al; 2006 IEEE Intelligent Vehicles Symposium; IEEE Conference Paper. (Year: 2006).

An evidential sensor model for Velodyne scan grids; Chunlei Yu et al; 2014 13th International Conference on Control Automation Robotics & Vision (ICARCV); IEEE Conference Paper. (Year: 2014).

Traffic Interction Detection Using Floating Car Data; Rong Hu et al; 2020 5th IEEE International Conference on Big Data Analytics (ICBDA); IEEE Conference Paper (Year: 2020).

Toward Distributed Streaming Data Sharing Manager for Autonomous Robot Control; Hiroaki Fukuda et al; 2020 IEEE/SICE International Symposium on System Integration (SII); IEEE Conference Paper (Year: 2020).

United States Patent and Trademark Office, Office Action for U.S. Appl. No. 16/271,381 dated May 7, 2021.

European Patent Office, International Preliminary Report on Patentability for PCT/US2019/024951 dated Apr. 27, 2021.

European Patent Office, International Preliminary Report on Patentability for PCT/US2019/024949 dated Apr. 27, 2021.

European Patent Office, International Preliminary Report on Patentability for PCT/US2019/024952 dated Apr. 27, 2021.

* cited by examiner

1000

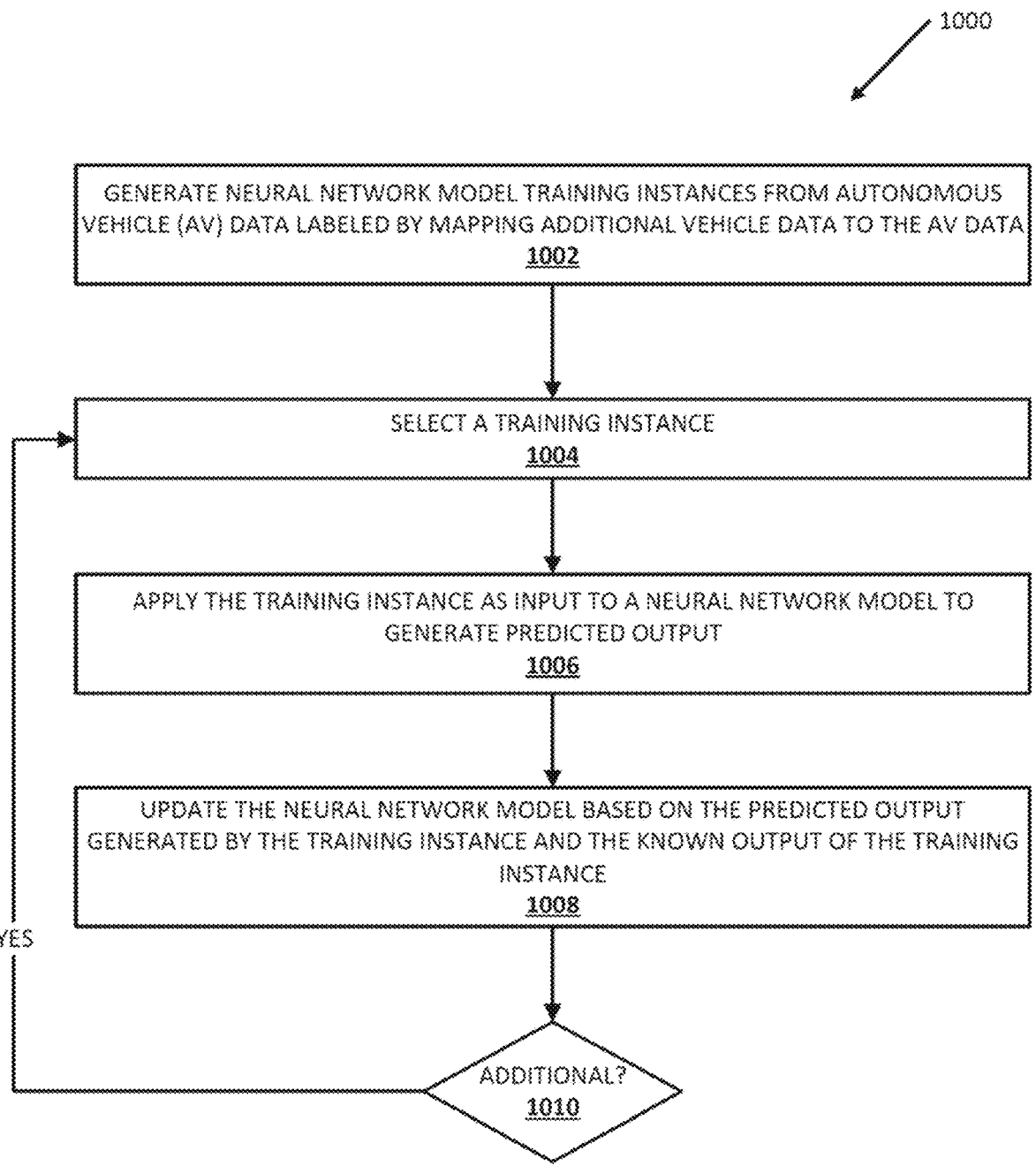

GENERATE NEURAL NETWORK MODEL TRAINING INSTANCES FROM AUTONOMOUS
VEHICLE (AV) DATA LABELED BY MAPPING ADDITIONAL VEHICLE DATA TO THE AV DATA
1002

SELECT A TRAINING INSTANCE
1004

APPLY THE TRAINING INSTANCE AS INPUT TO A NEURAL NETWORK MODEL TO
GENERATE PREDICTED OUTPUT
1006

UPDATE THE NEURAL NETWORK MODEL BASED ON THE PREDICTED OUTPUT
GENERATED BY THE TRAINING INSTANCE AND THE KNOWN OUTPUT OF THE TRAINING
INSTANCE
1008

YES

ADDITIONAL?
1010

FIG. 10

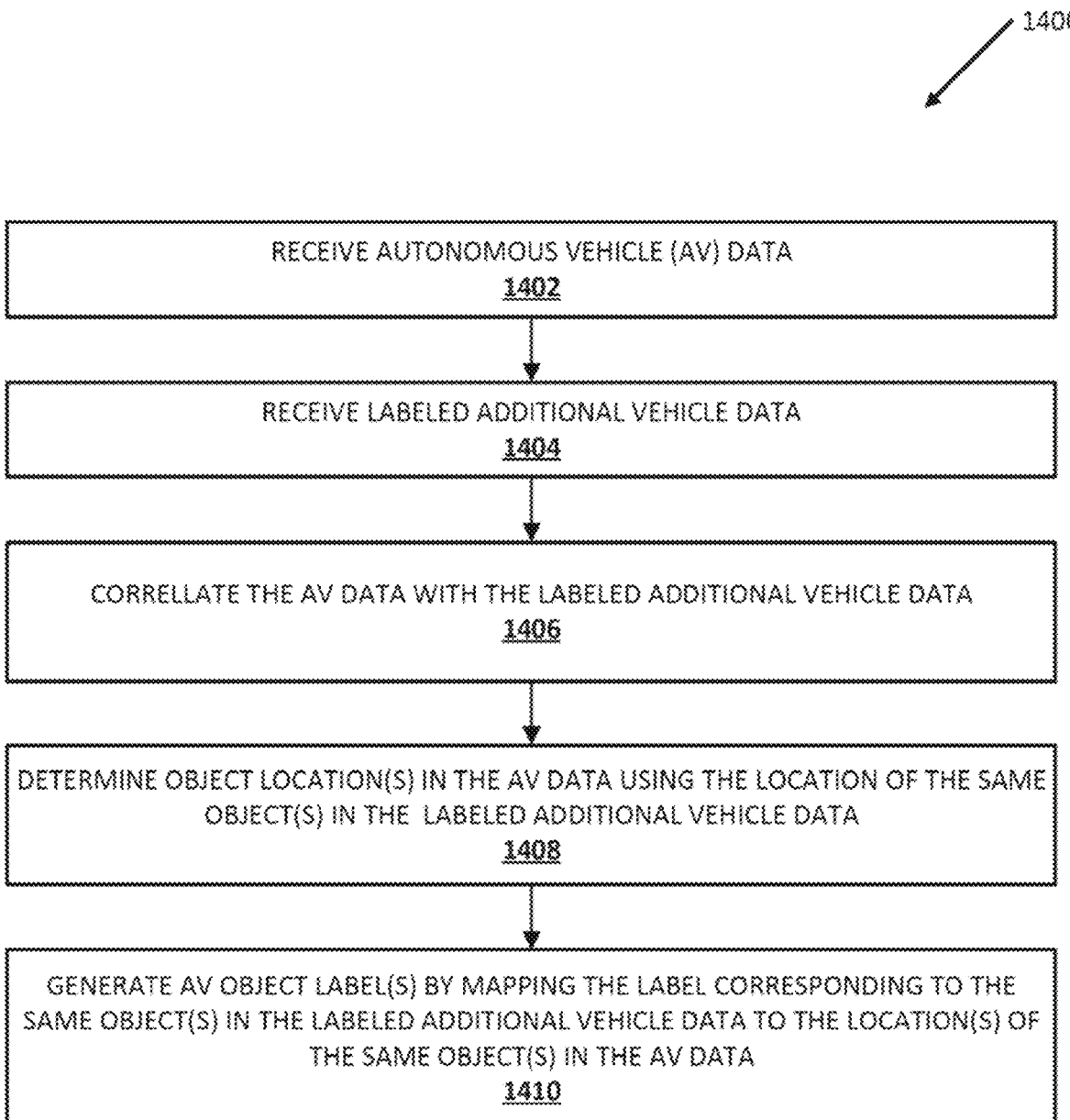

1400

RECEIVE AUTONOMOUS VEHICLE (AV) DATA
1402

RECEIVE LABELED ADDITIONAL VEHICLE DATA
1404

CORRELLATE THE AV DATA WITH THE LABELED ADDITIONAL VEHICLE DATA
1406

DETERMINE OBJECT LOCATION(S) IN THE AV DATA USING THE LOCATION OF THE SAME OBJECT(S) IN THE LABELED ADDITIONAL VEHICLE DATA
1408

GENERATE AV OBJECT LABEL(S) BY MAPPING THE LABEL CORRESPONDING TO THE SAME OBJECT(S) IN THE LABELED ADDITIONAL VEHICLE DATA TO THE LOCATION(S) OF THE SAME OBJECT(S) IN THE AV DATA
1410

FIG. 14

GENERATING LABELED TRAINING INSTANCES FOR AUTONOMOUS VEHICLES USING TEMPORALLY CORRELATED TIMESTAMPS

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed, and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only under certain conditions such as only in certain types of roads (e.g., highways) or only in certain geographic areas (e.g., a geofenced metropolitan area which has been adequately mapped). Finally, Level 5 autonomy represents that a vehicle is capable of operating without operator input under all conditions.

A fundamental challenge to any autonomy-related technology relates to collecting and interpreting information about a vehicle's surrounding environment, along with planning and executing commands to appropriately control vehicle motion to safely navigate the vehicle through its current environment. Therefore, continuing efforts are being made to improve each of these aspects, and by doing so autonomous vehicles increasingly are able to safely and reliably operate in increasingly complex environments and accommodate both expected and unexpected interactions within an environment. Such efforts may be achieve via more enriched data utilized in training the AV systems. Therefore, providing more diverse data sets represented in training instances enables the various AV systems to test driving scenarios and therefore improve the resultant decisions and actions taken by the AV.

SUMMARY

Collection of diverse data which may be utilized in training models or systems of an AV results in improved AV performance. Diversity of data may include vehicle sensor data in a location which has already been obtained and labeled for training purposes, but which is obtained from that same location but from a differing perspective, such as from another type of vehicle or from a vehicle approaching the area from a different direction. For example, data which has already been collected from an AV and labeled for use in training models or systems may be useful in labeling raw data collected from other vehicles in that same area, whether obtained by an AV or otherwise. Labels applied to data from a first vehicle may be extracted and applied to raw sensor data collected from a second vehicle. Applying such labels removes the necessity of manually labeling all the objects which may be obtained in a detected sensor field of the second vehicle and permits quick and efficient use of the data collected from the second vehicle without intervening manual labeling. Further, automatic labeling of the data collected from the second vehicle allows this data to be utilized in training of the AV systems since it provides an alternative viewpoint of the world, both from the perspective of a different vehicle state position and also different external environmental variables. For example, a labeled data set of a first vehicle approaching an intersection may be utilized in labeling a data set obtained by a second vehicle approaching the same intersection from a different direction. Thus, to provide a richer labeled set of training data for various AV systems, using a labeled data set of objects obtained from the first vehicle as a basis to transfer labels to collected data from a second vehicle is helpful.

The present disclosure is directed in part to the generation of training instances to train a machine learning model to generate one or more signals to control the actions of an autonomous vehicle performing a task. In many implementations, information can be collected from one or more additional vehicles and mapped to information collected from an autonomous vehicle. Autonomous vehicle data as used herein includes data streams captured from one or more sensors of an autonomous vehicle sensor suite as well as data captured from the autonomous vehicle including data from a controller area network ("CAN") bus of an autonomous vehicle. Additional vehicle data as used herein includes data streams captured from a second vehicle (either autonomous or non-autonomous) temporally and/or physically located near the autonomous vehicle in addition to the autonomous vehicle. In many implementations, an additional vehicle can be a non-autonomous vehicle and additional vehicle data can include data streams collected from a sensor suite of a removable hardware pod mounted on the non-autonomous vehicle as well as data streams collected by the removable hardware pod from the non-autonomous vehicle itself, such as data collected from a CAN bus of the non-autonomous vehicle. In other implementations, an additional vehicle can be an autonomous vehicle, and additional vehicle data can include data streams collected from a sensor suite of the corresponding autonomous vehicle, as well as data streams collected from the autonomous vehicle such as data from a CAN bus of the autonomous vehicle. Additionally or alternatively, data streams can be collected from an autonomous vehicle (e.g., autonomous vehicle data) and several additional vehicles (e.g., additional vehicle data) to quickly generate a large amount of collected data. For example, removable hardware pods can be mounted on several rental cars to quickly collect data in a new area. The amount of data collected can be increased by mounting additional removable hardware pods onto additional vehicles (i.e., hardware pods mounted on ten vehicles can collect more data compared to hardware pod mounted on three vehicles).

In some implementations, data that has been previously collected from an AV is labeled, the labels identifying objects seen in the various sensor fields. This labeled data is utilized in training scenarios (instances) for the models or systems to determine their response to the various input data. The output of the systems can then be verified to ground truth and losses identified. Utilizing these losses improves the underlying models or systems. The initial data however used for training only provides a single perspective of training the models or systems. It is beneficial to utilize significant other labeled data to further train. The object labels used in the training instances come from multiple sources, including human labeling. However, labeling sensor data to identify the various objects in the sensor field of view is both time consuming and inefficient.

Once labeled, objects in the various sensor fields of view may be identified. This labeled data may be considered ground truth data and be the basis of generating other labeled data for further training of the systems. Various implementations are disclosed herein which implement an automatic labeling method and system wherein labeled data obtained from a first vehicle may be applied to apply objects present in data obtained from a second vehicle within the same general area.

In many implementations, an autonomous vehicle sensor suite can include a variety of sensors including: three dimensional ("3D") positioning sensors (e.g., a Global Positioning System ("GPS")), a radio detection and ranging ("RADAR") unit, a light detection and ranging ("LIDAR") unit, an inertial measurement unit ("IMU"), one or more cameras, etc.

LIDAR units in accordance with many implementations can include units to collect a variety of specific types of LIDAR such as frequency-modulated continuous-wave LIDAR and/or other types of specialized LIDAR. In a variety of implementations, a removable hardware pod is vehicle agnostic and therefore can be mounted on a variety of non-autonomous vehicles including: a car, a bus, a van, a truck, a moped, a tractor trailer, a sports utility vehicle, etc. While autonomous vehicles generally contain a full sensor suite, in many implementations a removable hardware pod can contain a specialized sensor suite, often with fewer sensors than a full autonomous vehicle sensor suite, which can include: an IMU, 3D positioning sensors, one or more cameras, a LIDAR unit, etc. Additionally or alternatively, the hardware pod can collect data from the non-autonomous vehicle itself, for example, by integrating with the vehicle's CAN bus to collect a variety of vehicle data including: vehicle speed data, braking data, steering control data, etc. In some implementations, removable hardware pods can include a computing device which can aggregate data collected by the removable pod sensor suite as well as vehicle data collected from the CAN bus, and upload the collected data to a computing system for further processing (e.g., uploading the data to the cloud). In many implementations, the computing device in the removable pod can apply a time stamp to each instance of data prior to uploading the data for further processing. Additionally or alternatively, one or more sensors within the removable hardware pod can apply a time stamp to data as it is collected (e.g., a LIDAR unit can provide its own time stamp). Similarly, a computing device within an autonomous vehicle can apply a time stamp to data collected by the autonomous vehicle's sensor suite, and the time stamped autonomous vehicle data can be uploaded to the computer system for additional processing.

Time stamped data from an autonomous vehicle and time stamped data from an additional vehicle (e.g., a second autonomous vehicle, a non-autonomous vehicle equipped with a removable hardware pod, etc.) can be processed by a computing system. In some such implementations, the computing system can be remote to both the autonomous vehicle and the additionally vehicle. Offloading processing of autonomous vehicle data to a remote computing device (i.e., offline processing) can leave additional computational power available for additional tasks to be performed by a computing device in the autonomous vehicle in real time.

The computing system can determine overlapping data sets from the autonomous vehicle and the additional vehicle, i.e., data sets where the additional vehicle is in the sensor perception area of the autonomous vehicle in an environment. In some implementations, the additional vehicle does not need to be in the sensor perception area but only need to have a sensor field of view which overlaps the sensor field of view from the autonomous vehicle. In some implementations, an additional vehicle should be within two hundred fifty meters of the autonomous vehicle. An autonomous vehicle and an additional vehicle can move in and out of the vicinity of one another while collecting data. Portions of data sets can overlap where the additional vehicle is in the vicinity of the autonomous vehicle only at certain time stamps. In some such implementations, the entirety of the data sets can be processed. In other implementations, only the portions of the data sets where the vehicles are within the sensor perception area of each other can be processed (i.e., only particular time stamps of the data sets are processed). In even other implementations, portions of data sets where the vehicles are within overlapping sensor perception fields can be processed. Furthermore, the computing system can synchronize time stamps and/or locations between the autonomous vehicle data and the additional vehicle data. Additionally or alternatively, the computing device can determine only locations of the autonomous vehicle and the additional vehicle within the environment without consideration of the time stamps of the collected data.

In many implementations, the computing system can generate labels (in some cases automatically) for the autonomous vehicle data utilizing additional vehicle data. For example, the computing device can identify the additional vehicle in data stream captured by the autonomous vehicle sensor suite (i.e., the autonomous vehicle data) or may identify overlapping sensor fields between the two vehicles. Once located, the computing device can map data gathered at a particular time stamp by the additional vehicle (such as data collected from a non-autonomous vehicle mounted with a removable hardware pod) as well as other known information about the additional vehicle (e.g., vehicle type, vehicle make, vehicle model, vehicle year, vehicle dimensions, removable pod position on the vehicle, etc.) to the location of additional vehicle identified in the autonomous vehicle data. As another example, an additional vehicle can record vehicle velocity from data gathered via a CAN bus. This velocity measurement can be mapped to the location of the additional vehicle in the autonomous vehicle data stream, thus automatically generating a velocity label for the additional vehicle in the autonomous vehicle data stream. Additionally or alternatively, a tight bounding box can be generated around the additional vehicle in the autonomous vehicle data stream by utilizing, for example, one or more vehicle measurements provided in the additional vehicle data.

In other examples, the computing device can map data gathered in a particular location by the additional vehicle sensors. The additional vehicle may be a vehicle with removable hardware for collecting the data or may be another autonomous vehicle. The objects that are captured by the sensor fields of view of the two vehicles can form the basis of automated labeling from a first vehicle (for example an additional vehicle with a removable sensor pod) data stream to the second vehicle unlabeled data stream (for example an autonomous vehicle in that same general location). The sensor data captured by either vehicle does not have to be a particular type of vehicle. For example, both vehicles may be AVs, may both be vehicles with removable hardware pods having sensors located therein or may be a mix of both. In some instances, the sensors utilized in both the first and the second vehicle may be similar so that objected detected in one sensor detection field of a first vehicle are similarly detected in a second sensor detection field of a second vehicle.

Additionally or alternatively, the labeled objects from the additional vehicle sensor data stream may be used to generate a tight bounding box around the various objects captured by the sensors of the autonomous vehicle data stream by utilizing, for example, transformation calculations. For example, an object that is labeled and present in a first vehicle data stream is used to label objects in the second vehicle data stream in instances where the two vehicles are in overlapping sensor fields of view. In some implementations, it may be determined that a sensor field of view for a first vehicle is co-located with an overlapping sensor field of view from a second vehicle. In these instances, objects that are labeled and apparent in the labeled data stream from the first vehicle sensors may be located, their location transformed from the perspective/pose of the first vehicle sensors, to the same objection location from the perspective/pose of the second vehicle sensors. This object position transformation, from the perspective of the sensors of the first vehicle to the perspective of the sensors of the second vehicle, may form the basis of abounding box around the object. Once labeled, the data stream from the second vehicle may be used to train machine learning models and/or systems of an AV.

In many implementations, a computing system can train a machine learning model for use in generating one or more control signals for the autonomous vehicle with training instances which include an instance of autonomous vehicle data where the additional vehicle can be captured by one or more sensors of the autonomous vehicle sensor suite and a corresponding label for the additional vehicle (e.g., known information about the additional vehicle, data captured using a removable hardware pod mounted on the additional vehicle, etc.). In a variety of implementations, the one or more labels can be compared with a predicted output generated by the machine learning model, such as a neural network model, to update one or more weights (i.e., through backpropagation) of the machine learning model. In addition thereto, targeted labeled training data can be generated for specific autonomous vehicle tasks. Autonomous vehicle tasks can include control signals indicating a route change action, a planning action, and/or other autonomous vehicle actions which are generated in response to data collected from one or more autonomous vehicle sensors. Waiting for training data to be gathered for some autonomous vehicle tasks, such as correctly responding to maneuver around a car parallel parking on the side of the road, can take extended periods of time (e.g., weeks, months, etc.) as the tasks occurs at random times. In contrast, in various implementations, an additional vehicle can be driven near the autonomous vehicle to generate the training data in a few days and/or hours. For example, the additional vehicle can repeatedly parallel park on the side of the road ahead of the autonomous vehicle, and data gathered by both the additional vehicle and the autonomous vehicle can generate training data to train a neural network model for use in controlling an autonomous vehicle when a nearby car is parallel parking. Additionally or alternatively, a seemingly endless diversity of data to generate targeted training instances for any of a variety of autonomous vehicle tasks can be generated by driving an additional vehicle around an autonomous vehicle in accordance with many implementations. In some instances, targeted labeled training data can include vehicle behaviors at intersections, on-coming lane intrusion, increased braking and other unusual behavior wherein data may be collected for enhanced and robust divers training data.

In many implementations, a computing system can train a machine learning model for use in generating one or more control signals for the autonomous vehicle with training instances which include an instances of vehicle data where the sensor data stream captures objects similarly captured by a co-located labeled second vehicle data stream. By co-located it is meant that the sensor field of view for the first vehicle overlaps in some manner the sensor field of view for the second vehicle. The labels for various objects detected by one or more sensors of the second vehicle sensor suite may be applied as a corresponding label for object in the first vehicle data sensor stream (e.g., traffic lights, intersections, street signs, etc.). In a variety of implementations, the one or more labeled sensor data streams can be compared with a predicted output generated by the machine learning model, such as a neural network model, to update one or more weights (i.e., through backpropagation) of the machine learning model. In addition thereto, targeted labeled training data can be generated for specific autonomous vehicle tasks or responding to sensed objects within the vehicle sensor field of view. Autonomous vehicle tasks can include control signals indicating a route change action, a planning action, and/or other autonomous vehicle actions which are generated in response to data collected from one or more autonomous vehicle sensors. Waiting for training data to be gathered for autonomous vehicle tasks, such as correctly identifying and approaching a traffic light at an intersection with other vehicles present and from different directions, can take extended periods of time (e.g., weeks, months, etc.) as the events occur at random times.

In contrast, in various implementations, an additional vehicle can be driven in a co-located geographical area already driven by an autonomous vehicle to generate the training data in a few days and/or hours where the data stream of the autonomous vehicle is already labeled and available. For example, an autonomous vehicle has collected a sensor data stream for a particular intersection which has a traffic light and is appropriately labeled. An additional vehicle can be used to approach the same intersection with the traffic light from multiple directions. The sensor field of view of the various object detected from the autonomous vehicle has labeled objects at the intersection from a first direction. The sensor data streams from the additional vehicle may be labeled based upon the already collected and labeled sensor data stream from the autonomous vehicle and may include a variety of alternative perspectives of the intersection. Once labeled, the plurality of sensor data streams from the additional vehicle (e.g. where the additional vehicle is approaching the intersection from various directions), and the autonomous vehicle can generate training data to train a neural network model for use in controlling an autonomous vehicle which is approaching a lighted intersection. Additionally or alternatively, an endless diversity of data to generate targeted training instances for any of a variety of autonomous vehicle tasks can be generated by driving an additional vehicle in an area already collected by an autonomous vehicle and labeled, in accordance with many implementations. In some instances, targeted labeled training data can include vehicle behaviors at intersections, different perspectives of identified objects and the effect the objects have on vehicle handling, on-coming lane intrusion, increased braking and other unusual behavior wherein data may be collected for enhanced and robust divers training data.

Similarly, for example, a computing device can generate testing data for a trained machine learning model, where testing data includes an instance of an autonomous vehicle data where the additional vehicle is captured by one or more sensors of the autonomous vehicle (i.e., training input) and a corresponding label for the additional vehicle (i.e., known output). For example, a machine learning model can be trained to predict one or more control signals to perform a specific autonomous vehicle task, such as operating the autonomous vehicle at a four way stop. Testing data can be generated by repeatedly driving one or more additional vehicles through a four way stop in an environment with an autonomous vehicle. The accuracy of the machine learning model to predict control signal(s) for the autonomous vehicle can be evaluated for a variety of tasks using testing data generated in accordance with many implementations.

As well, for example, a computing device can generate testing data for a trained machine learning model, where testing data includes an instance of an autonomous vehicle data where the sensor data is captured by one or more sensors of the vehicle (i.e., training input) and corresponding labels for various objects within the sensor field of view of the vehicle (i.e., known output). For example, a machine learning model can be trained to identify one or more objects within the sensor field of view, such as operating the autonomous vehicle approaching a traffic light. Testing data can be generated by approaching the intersection with the traffic light from multiple directions. The accuracy of the machine learning model to predict identification of the traffic light from multiple directions can be evaluated for a variety of tasks using testing data generated in accordance with many implementations.

In other implementations, a variety of driving scenario instances may be generated to test control signals generated by the autonomous vehicle. A computing device can generate testing data for a trained machine learning model, where testing data includes an instance of an autonomous vehicle data where the sensor data is captured by one or more sensors of the vehicle (i.e., training input) and corresponding labels for various objects within the sensor field of view of the vehicle (i.e., known output). For example, a machine learning model can be trained to approach an intersection having a traffic light wherein the model controls the operation of the autonomous vehicle as it approaches the intersection with the traffic light. Testing data can generated by approaching the intersection with the traffic light from a first direction wherein the sensor data stream is labeled (e.g. labeled by the perception system of the automobile or by manual labeling). These object labels may then be applied to sensor data streams of additional a vehicle approaching the intersection of the traffic light from multiple directions. Multiple testing instances may then be generated using the variety of labeled sensor data streams provided as input to a machine learning model, from multiple directions, to determine the output of the model (e.g. the control signals generated to control the autonomous vehicle as it approaches the intersection with the traffic light). The accuracy of the model to generate appropriate AV commands as it approaches the traffic light from multiple directions can be evaluated using testing data generated in accordance with many implementations.

Providing as input a variety of testing instances including labeled sensor data as outlined in the many implementations described herein allows testing and training of the various models and systems from a large number of training examples. For instance, once labeled data is obtained from a suite of sensors of a vehicle which are commensurate to a sensor suite of an AV, multiple sensor streams may be recorded from the same area. Where sensor fields of views for the labeled data overlap from later collected sensor fields of view, automatic labeling of the collected data allows quick growth of the available testing data for the models. By quickly obtaining these other training sensor data sets from differing perspectives, a richer training regimen may be provided to the models depending on the sensor fields of view for interpreting the world to generate AV control commands. Thus, less processing may be needed to effectively train a model which controls an autonomous vehicle. Also, for example, by training a model to identify objects more accurately within the sensor field of view of the model, a better response of the AV may be expected to objects identified in the perception field of the vehicle.

In many implementations, training and/or testing machine learning models for use in autonomous vehicles requires a large amount of data. Testing instances and/or training instances have traditionally been generated by users annotating snapshots of sensor data (i.e., a human generates a label). Labeling data by hand one instance of sensor data at a time is time consuming as well as computationally expensive to visualize the sensor data in a way that is comprehensible to a human. Additionally or alternatively, a user labeling sensor data can be error prone. For example, the repetitive nature of the labeling task can cause a user labeling the sensor data to miss labels and/or generate less accurate labels over time. In contrast, automatically generated labeled data streams occurs much quicker than user labeling, does not use additional computational resources to display sensor data to a user, is not prone to errors, etc.

Additionally or alternatively, some implementations disclosed herein can label data that a user is unable to label. The difficulty to accurately label an object increases as distance from the object increases. Known dimensions of an additional vehicle (e.g., known dimensions for the make and model of the vehicle a removable hardware pod is mounted onto) can be utilized in generating a bounding box around the vehicle in the autonomous vehicle data stream. Automatic labeling systems can generate a more precise bounding box around an additional vehicle than a user, especially at a great distance. Furthermore, partial object occlusions from other elements in the environment can prevent a user for accurately labeling an object. Automatic labeling systems, using known dimensions of an additional vehicle, can generate an accurate label despite a partial occlusion of the additional vehicle. Additionally or alternatively, relative speed of an object can induce motion blur to data collected by the sensor suite of the autonomous vehicle which can make an object more difficult for a user to label. In contract, automatic labeling systems by having knowledge about object measurements, can accurately label rapidly moving objects.

Additionally or alternatively, some implementations disclosed herein can label data that a user is unable to label. The difficulty to accurately label an object increases as distance from the object increases. Known object labels of an object detected by a sensor suite from a first vehicle (e.g., an object that is within the perception field of the first vehicle and is appropriately labeled, however that label is applied) can be utilized in generating a bounding box and label around the object from a sensor data stream from a second vehicle that may be further away from the object than the first vehicle. Automatic labeling systems can generate a more precise bounding box around a faraway object than a user, especially at a great distance. Furthermore, partial object occlusions from other elements in the environment can prevent a user for accurately labeling an object. Automatic labeling systems, using known positions of the object from a first vehicle perspective, can generate an accurate label despite a partial occlusion of the object from the second vehicle. Additionally or alternatively, relative speed of an object can induce motion blur to data collected by the sensor suite of the vehicle which can make an object more difficult for a user to label. In contract, automatic labeling systems by having knowledge about object location and label can accurately label rapidly moving objects.

In some such implementations, automatically generated labels can be used in training instances and/or testing instances. Additionally or alternatively, highly accurate automatically generated labels can improve the accuracy of testing instances and/or training instances for machine learning models. More accurate testing and/or training instances will lead to a more accurate machine learning model. In some such implementations, a more accurate machine learning model can increase the safety of users riding in an autonomous vehicle, riding in other vehicles in the vicinity of the autonomous vehicle, walking in the vicinity of the autonomous vehicle, and/or additional user interactions with the autonomous vehicle.

The above description is provided as an overview of various implementations disclosed herein. Those various implementations, as well as additional implementations, are described in more detail herein.

In some implementations, a method of training a machine learning model with targeted training instances to be used in autonomous control of at least one autonomous vehicle includes generating a plurality of targeted training instances. Generating each of the targeted training instances includes generating autonomous vehicle training input of the targeted training instance based on an instance of autonomous vehicle data wherein at least one of the sensors of an autonomous vehicle sensor suite detects an additional vehicle. The method further includes generating a label of the autonomous vehicle training input indicating a current state of at least one attribute of the additional vehicle using a determined corresponding instance of additional vehicle data which temporally corresponds with the instance of autonomous vehicle data detecting the additional vehicle, where at least one of the sensors in an additional vehicle sensor suite detects the at least one attribute of the additional vehicle. The method further includes generating the trained machine learning model by applying the autonomous vehicle data portion of the targeted training instances as training input to the machine learning model to generate predicted output of the machine learning model, and updating one or more weights in the machine learning model by determining a difference between the predicted output and the label of the targeted training instance.

In various implementations herein, labels may be generated for objects in a data stream of a first sensor suite of a first vehicle by supervised labeling. Such supervised labeling may be human labeling. In some implementations, the object labels may be derived from an AV system, such as a perception system. In some of these implementations, the labels may be verified before being applied to a data stream of a sensor suite for a second vehicle. In other implementations, labels for objects in a sensor data stream may be automatically applied after collection by a computer imaging detection system. Labels generated and applied to objects detected in a first data stream may be utilized in the various implementations and embodiments hereof. Further, labels generated and applied to data streams may be utilized as targeted training instances which are provided as input to a machine learning model which controls an AV.

In some implementations, the sensor suite data streams may be from an AV sensor suite or from an automobile having a removable POD which contains similar sensor suite to that of an AV. In some instances, the sensor suite data stream obtains data, for later labeling as set forth herein, that is sufficient to be fed into various portions of an AV control system to generate output to control the AV. In some implementations, the sensor suite data stream is from an AV wherein the data is only partially or not labeled. In other implementations, the sensor suite data stream is from a replaceable POD hardware attached to a vehicle and driven by a human and generates the same data as an AV for later labeling and use in training. In some other implementations, the sensor suite data stream is unmodified other than applying the labels from an alternative sensor suite data stream, such as from an AV.

These and other implementations of the technology disclosed herein can include one or more of the following features.

In some implementations, the machine learning model is a neural network model. In some versions of those implementations, the method further includes generating the trained neural network model using supervised learning by applying the autonomous vehicle data portion of the targeted training instances as training input to the neural network model to generate predicted output of the neural network model. In some versions of those implementations, the method further includes updating, using backpropagation, the one or more weights in the neural network model by determining a difference between the predicted output and the label of the targeted training instance.

In some implementations, the method further includes providing the trained neural network model for use in control of the autonomous vehicle.

In some implementations, the additional vehicle is a second autonomous vehicle.

In some implementations, the autonomous vehicle sensor suite comprises at least a Global Positioning System (GPS) unit, a radio direction and ranging (RADAR) unit, a light detection and ranging (LIDAR) unit, one or more cameras, and an inertial measurement (IMU) unit. In some versions of those implementations, autonomous vehicle data comprises at least GPS data, RADAR data, LIDAR data, one or more images from the one or more cameras, and IMU data.

In some implementations, the additional vehicle is a non-autonomous vehicle and the additional vehicle sensor suite is a removable hardware pod. In some versions of those implementations, the removable hardware pod is mounted onto the additional vehicle. In some versions of those implementations, the removable hardware pod comprises at least a Global Positioning System (GPS) unit, a light detection and ranging (LIDAR) unit, and one or more cameras. In some versions of those implementations, additional vehicle data comprises at least GPS data, LIDAR data, one or more images from one or more cameras, IMU data, and known additional vehicle data. In some versions of those implementations, known additional vehicle data is selected from a group consisting of a vehicle make, a vehicle model, a vehicle color, a vehicle year, one or more vehicle dimension measurements, and a position of where the removable hardware pod is mounted on the additional vehicle, and combinations thereof. In some versions of those implementations, the method further includes determining a location of the autonomous vehicle for each instance of the autonomous vehicle data utilizing GPS data from the one or more sensors of the autonomous vehicle. In some versions of those implementations, the method further includes determining a location of the additional vehicle in each instance of autonomous vehicle data utilizing GPS data from the corresponding instance of additional vehicle data. In some versions of those implementations, the method further includes determining a location of the autonomous vehicle in each instance of autonomous vehicle data and a location of the additional vehicle detected by at least one of the sensors of the autonomous vehicle in the autonomous vehicle data by localizing a location of the autonomous vehicle and a location of the additional vehicle using one or more common landmarks identified in the autonomous vehicle data and the corresponding instance of additional vehicle data. In some versions of those implementations, the method further includes determining a bounding box indicating the location of the additional vehicle detected in the autonomous vehicle data utilizing the one or more vehicle dimension measurements, the position where the removable hardware pod is mounted onto the additional vehicle, and a determined distance between the autonomous vehicle and the additional vehicle.

In some implementations, the additional vehicle is selected from a group consisting of a car, a van, a truck, a bus, a motorcycle, and a tractor trailer.

In some implementations, generating the trained machine learning model further includes not overfitting the machine learning model to the removable hardware pod. In some versions of those implementations, not overfitting the machine learning model to the removable hardware pod includes utilizing a plurality of shapes for an enclosure for the one or more sensors of the removable hardware pod. In some versions of those implementations, not overfitting the machine learning model to the removable hardware pod includes utilizing a plurality of mounting positions to mount the removable hardware pod onto the additional vehicle. In some versions of those implementations, not overfitting the machine learning model to the removable hardware pod includes masking out the removable hardware pod mounted onto the additional vehicle in each instance of autonomous vehicle data detecting the additional vehicle using one or more image processing techniques.

In a variety of implementations, a method of training a machine learning model to be used in autonomous control of at least one autonomous vehicle implemented by one or more processors is provided, the method including utilizing a machine learning model in controlling an autonomous vehicle. Training the machine learning model includes generating a plurality of training instances. Generating the plurality of training instances includes receiving a first instance of sensor data collected using a first sensor suite of a first vehicle, wherein one or more objects are captured in the first instance of sensor data. The method further includes receiving a second instance of data collected using a second suite of a second vehicle, wherein the second instance of sensor data collected using the second sensor suite of the second vehicle is temporally correlated with the first instance of sensor data collected using the first sensor suite of the first vehicle, wherein the one or more objects captured in the first instance of sensor data are captured in the second instance of data, and wherein the second instance of data includes one or more object labels, wherein each object label corresponds to a distinct object of the one or more objects. The method further includes automatically generating one or more object labels for the first instance of sensor data by mapping the one or more object labels included in the second instance of data to one or more corresponding locations of the one or more objects in the first instance of sensor data. Using the plurality of training instances, training the machine learning model includes processing the first instance of sensor data collected using the first sensor suite of the first vehicle using the machine learning model to generate predicted output. The method further includes determining a difference between the predicted output and the one or more automatically generated object labels for the first instance of sensor data. The method further includes updating one or more weights used for the machine learning model based on the determined difference.

These and other implementations of the technology disclosed herein can include one or more of the following features.

In a variety of implementations, the machine learning model is a neural network model and wherein updating the one or more weights in the machine learning model based on the determine difference includes updating, using backpropagation, one or more weights in the neural network model using the determined difference.

In a variety of implementations, the one or more objects are distinct from the first vehicle and are distinct from the second vehicle.

In a variety of implementations, the first instance of sensor data collected using a first sensor suite of a first vehicle includes a corresponding first time stamp, and wherein at least one of the sensors in the sensor suite detects the second vehicle. In some such implementations, the second instance of data includes a corresponding second time stamp. In some such implementations, the second instance of data collected using the second sensor suite of the second vehicle is temporally correlated with the first instance of sensor data collected using the first sensor suite of the first vehicle by temporally correlating the first time stamp of the first instance of sensor data with the second time stamp of the second instance of data.

In some implementations, automatically generating the one or more object labels for the first instance of sensor data by mapping the one or more object labels included in the second instance of data to one or more locations of the corresponding one or more objects in the first instance of sensor data includes, for each object corresponding to the one or more object labels in the second instance of data, determining a location of the object in the second instance of data. The method further includes determining a corresponding location of the object in the first instance of sensor data. The method further includes generating the object label for the first instance of sensor data by mapping the label of the object to the location of the object in the first instance of sensor data. In some such implementations, determining the location of the object in the second instance of data and determining the corresponding location of the object in the first instance of sensor data includes determining the location of the object in the second instance of data with respect to a common coordinate system. The method further includes determining the corresponding location of the object in the first instance of sensor data with respect to the common coordinate system. In some such implementations, determining the location of the object in the second instance of data and determining the corresponding location of the object in the first instance of sensor data includes determining the location of the object in the second instance of data with respect to a coordinate system of the second vehicle. The method further includes determining the corresponding location of the object in the first instance of sensor data with respect to the coordinate system of the second vehicle.

In various implementations, the first vehicle is a first autonomous vehicle, wherein the first sensor suite of the first vehicle is a first autonomous vehicle sensor suite, and wherein the first autonomous vehicle sensor suite comprises at least a Global Positioning System (GPS) unit, a radio direction and ranging (RADAR) unit, a light detection and ranging (LIDAR) unit, one or more cameras, and an inertial measurement unit (IMU). In some such implementations, the first instance of sensor data collected using the sensor suite of the first autonomous vehicle comprises at least GPS data, RADAR data, LIDAR data, one or more images from one or more cameras, and IMU data. In some such implementations, the second vehicle is a second autonomous vehicle, wherein the second sensor suite of the second vehicle is a second autonomous vehicle sensor suite. In some such implementations, the second vehicle is a non-autonomous vehicle and the second sensor suite of the second vehicle is a removable hardware pod. In some such implementations, the removable hardware pod is mounted onto the second vehicle. In some such implementations, the removable hardware pod includes at least a Global Positioning System (GPS) unit, a light detection and ranging (LIDAR) unit, and one or more cameras.

In a variety of implementations, generating each of the training instances further includes receiving a third instance of sensor data using a third sensor suite of a third vehicle, wherein the third instance of sensor data is temporally correlated with the first instance of sensor data and is temporally correlated with the second instance of data, and wherein the third instance of sensor data includes one or more additional object labels corresponding to the one or more objects captured in the third instance of data. The method further includes automatically generating the one or more object labels for the first instance of sensor data by mapping the one or more object labels included in the second instance of data to the one or more locations of the corresponding one or more objects in the first instance of sensor data, and mapping the one or more additional object labels included in the third instance of sensor data to the one or more locations of the corresponding one or more objects in the first instance of sensor data. In some such implementations, the third vehicle is a third autonomous vehicle. In some such implementations, the third vehicle is an additional non-autonomous vehicle and the third sensor suite of the third vehicle is a removable hardware pod.

In addition, some implementations include one or more processors (e.g., central processing unit(s) ("CPU"(s)), graphics processing unit(s) ("GPU"(s)), and/or tensor processing unit(s) ("TPU"(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 10 is a flowchart illustrating another example process of performing selected aspects of the present disclosure, in accordance with various implementations.

FIG. 14 is a flowchart illustrating another example process of performing selected aspects of the present disclosure, in accordance with various implementations.

DETAILED DESCRIPTION

Figure 1:
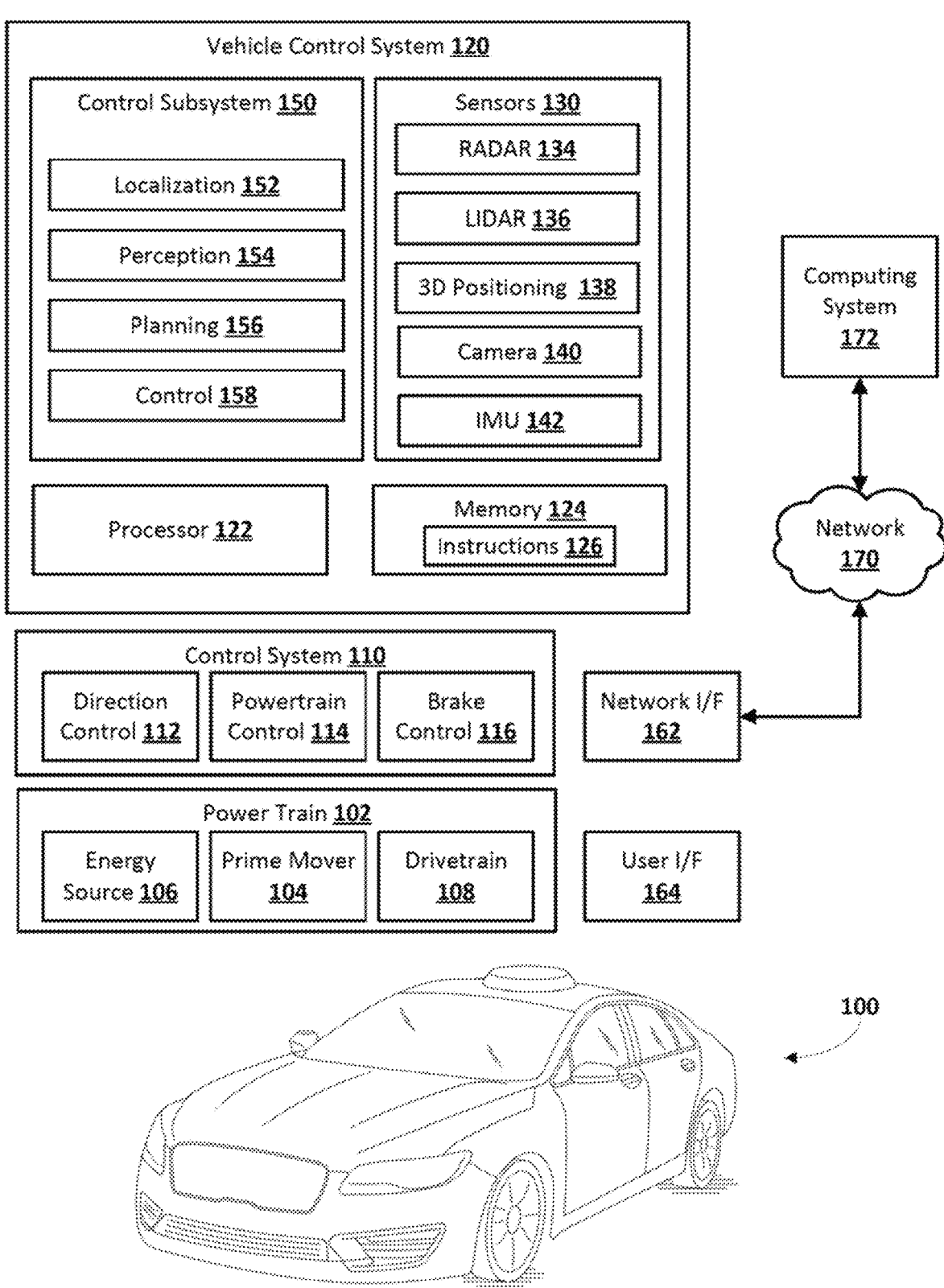
FIG. 1 illustrates an example environment in which implementations disclosed herein may be implemented.

Referring to FIG. 1, an example autonomous vehicle 100 within which the various techniques disclosed herein may be implemented. Vehicle 100, for example, may include a powertrain 102 including a prime mover 104 powered by an energy source 106 and capable of providing power to a drivetrain 108, as well as control system 110 including a direction control 112, a powertrain control 114, and brake control 116. Vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. Drivetrain 108 include wheels and/or tires along with a transmission and/or any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators and/or sensors for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle 100. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls, as will be appreciated by those of ordinary skill having the benefit if the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include RADAR unit 134, LIDAR unit 136, a 3D positioning sensors 138, e.g., a satellite navigation system such as GPS, GLONASS, Bei-Dou, Galileo, Compass, etc.

The 3D positioning sensors 138 can be used to determine the location of the vehicle on the Earth using satellite signals. Sensors 130 can optionally include a camera 140 and/or an IMU 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. Localization subsystem 152 is principally responsible for precisely determining the location and orientation (also sometimes referred to as "pose") of vehicle 100 within its surrounding environment, and generally within some frame of reference. The location of an autonomous vehicle can be compared with the location of an additional vehicle in the same environment as part of generating labeled autonomous vehicle data. Perception subsystem 154 is principally responsible for detecting, tracking, and/or identifying elements within the environment surrounding vehicle 100. Planning subsystem 156 is principally responsible for planning a trajectory for vehicle 100 over some timeframe given a desired destination as well as the static and moving objects within the environment. A machine learning model in accordance with several implementations can be utilized in planning a vehicle trajectory. Control subsystem 158 is principally responsible for generating suitable control signals for controlling the various controls in control system 120 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for vehicle control system 120 is merely exemplary in nature. Individual sensors may be omitted in some implementations. Additionally or alternatively, in some implementations multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, whine in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others. Furthermore, vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which vehicle 100 receives environmental and other data for use in autonomous control thereof. In many implementations, data collected by one or more sensors 130 can be uploaded to computing system 172 via network 170 for additional processing. In some such implementations, a time stamp can be added to each instance of vehicle data prior to uploading. Additional processing of autonomous vehicle data by computing system 172 in accordance with many implementations is described with respect to FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art, having the benefit of the present disclosure, will recognize that the exemplary environment illustrated in FIG. 1 is not intended to limit implementations disclosed herein. Indeed, those skilled in the art will recognize that other alternative hardware and/or software environments may be used without departing from the scope of implementations disclosed herein.

Figure 2A:
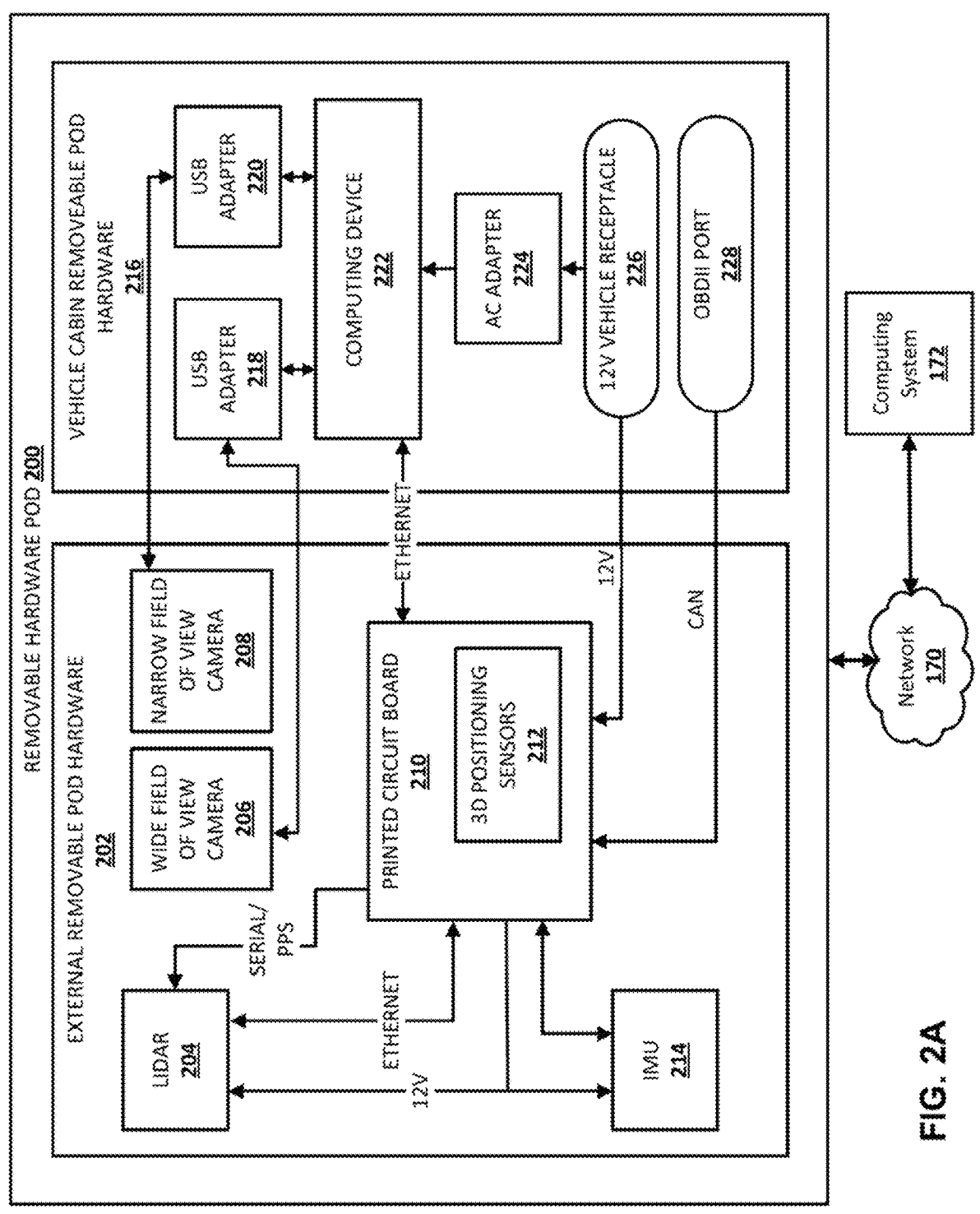
FIG. 2A illustrates a block diagram of a removable hardware pod in which implementations disclosed herein may be implemented.
Figure 2B:
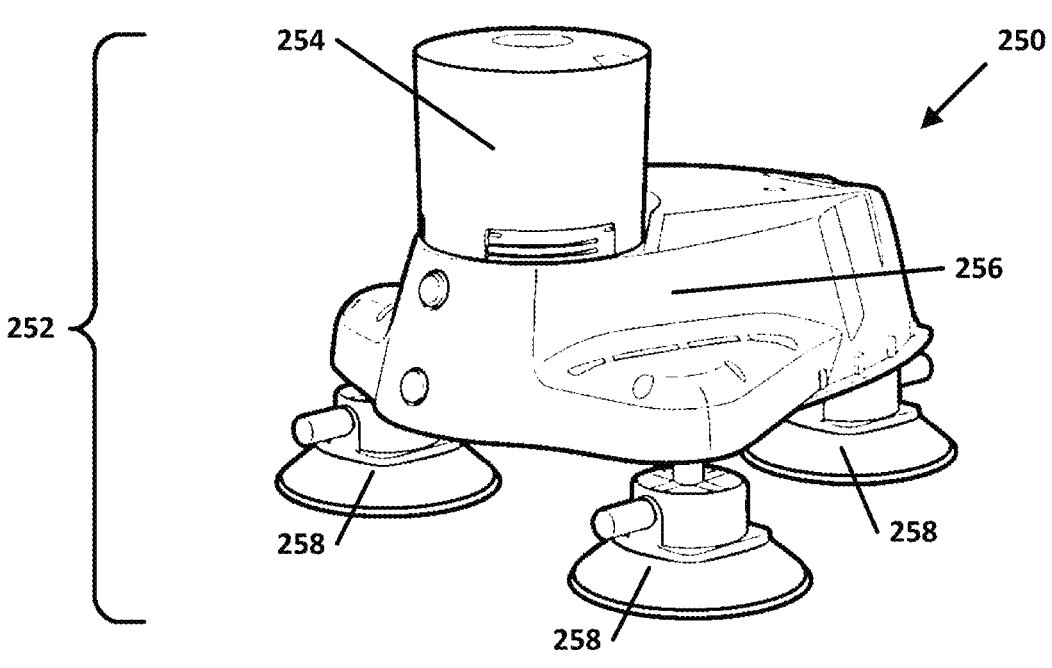
FIG. 2B illustrates an example removable hardware pod in which implementations disclosed herein may be implemented.

Referring to FIG. 2A, an additional example environment is illustrated in which implements disclosed herein may be implemented. Removable hardware pod 200 in FIG. 2A includes external removable pod hardware 202 and vehicle cabin removable pod hardware 216. External removable pod hardware 202 can include a variety of sensors to collect environmental data. In a variety of implementations, a pod sensor suite can include LIDAR unit 204, wide field of view camera 206, narrow field of view camera 208, 3D positioning sensors 212 such one or more Global Navigation Satellite Systems including: GPS, GLONASS, BeiDou, Galileo, Compass, etc., IMU 214, etc. In a variety of implementations, a printed circuit board ("PCB") 210 can be utilized to provide connections between various sensors within the sensor suite of external removable pod hardware 202. In a variety of implementations, one or more components of external removable pod hardware 202 can be contained in hardware housing 256 as illustrated in FIG. 2B.

Vehicle cabin removable pod hardware 216 can be separate from the mountable pod hardware. In some implementations, vehicle cabin removable pod hardware 216 can include USB adapters 218, 220, computing device 222, AC adapter 224, 12V vehicle receptacle 226, OBDII port 228, etc. Computing device 222 can include a variety of devices including a laptop computing device, a tablet computing device, a cellular telephone computing device, etc.

The vehicle itself can power external removable pod hardware 202 and/or computing device 222. In some such implementations, 12V vehicle receptacle 226 can connect to PCB 210 to provide power to external removable pod hardware 202. Similarly, 12V vehicle receptacle 226 can provide power to AC adapter 224. In some such implementations, AC adapter 224 can provide power to computing device 222. In other implementations, the hardware pod can receive power from one or more USB ports in the vehicle, or various other electrical connections with in the vehicle, such as a vehicle taillight, etc. (not illustrated). Furthermore, computing device 222 can include one or more USB ports, each of which can connect to one or more USB adapters such as USB adapter 218, 220.

Environmental data collected by one or more cameras (e.g., cameras 206/208) can be transmitted via a USB adapter (e.g., USB adapters 218/220) to computing device 222. Additionally or alternatively, one or more cameras can receive power using a USB adapter. Furthermore, computing device 222 can transmit one or more control signals to one or more cameras utilizing connections made by USB adapters. For example, wide field of view camera 206 can transmit environmental data to computing device 222, receive command signals from computing device 222, and/or be powered utilizing USB adapter 218. Similarly, narrow field of view camera 208 can transmit environmental data to computing device 222, receive command signals from computing device 222, and/or be powered utilizing USB adapter 220. In some implementations, multiple cameras can connect to computing device 222 via a single USB adapter. Additionally or alternatively, in many implementations any of a variety of cameras can be used including the aforementioned wide field of view camera 206 and narrow field of view camera 208 as well as a light field camera, a thermal imaging camera, etc. In many implementations, one or more cameras can connect directly to PCB 210 (not illustrated).

Computing device 222 can connect to PCB 210 in external removable pod hardware 202 via an Ethernet connection. In many implementations, an Ethernet connection can be a wired connection. Additionally or alternatively, an Ethernet connection can be a wireless connection. Computing device 222 can transmit information to PCB 210 as well as receive environmental data collected by a variety of sensors in the external removable hardware pod 202 via the Ethernet connection. In some implementations, 3D positioning sensors 212 can be integrated directly into PCB 210. In other implementations, 3D positioning sensors 212 can be separate and connect with PCB 210 (not illustrated).

PCB 210 can provide power (for example 12V) to a variety of sensors including 3D positioning sensors 212, LIDAR unit 204, IMU 214, wide field of view camera 206 (not illustrated), narrow field of view camera 208 (not illustrated), etc. In many implementations, PCB 210 can synchronize timing with LIDAR unit 204 via a serial pulse per second ("PPS") connection. Additionally or alternatively, PCB 210 and LIDAR unit 204 can transmit and receive data via an Ethernet connection. For example, environmental data collected by LIDAR unit 204 can be transmitted to PCB 210 via an Ethernet connection. In various implementations, PCB 210 can transmit and receive information with IMU 214. In many implementations, PCB 210 can interface with vehicle data ports, such as OBDII port 228, to additionally collect a variety of corresponding vehicle data. Additionally or alternatively, computing device 222 can interface with a vehicle data port including OBDII port 228 to collect a variety of additional vehicle data (not pictured) such as information collected from the additional vehicle's CAN bus. Additional vehicle data in accordance with many implementations can include: vehicle speed data, braking data, steering control data, etc.

In a variety of implementations, environmental data and/or vehicle data can be appended with a time stamp by PCB 210, computing device 222, and/or individual sensors (e.g., LIDAR units can generate their own time stamps). Additionally or alternatively, time stamped environmental and/or time stamped vehicle data can be combined and uploaded to the cloud using computing device 222 in conjunction with known communication pathways and hardware. In some such implementations, the removable pod can combine time stamped environmental data and time stamped vehicle data by creating an instance of data at each time step (i.e., each instance of data can include environmental data at a specific time stamp (if any) as well as vehicle data at the same specific time stamp (if any)).

FIG. 2B illustrates an image 250 of a removable pod in accordance with implementations disclosed herein. Removable pod 252 can include a variety of elements such as one or more sensors 254, hardware housing 256, removable pod mount(s) 258, etc. One or more sensors 254 which can be utilized in removable pod 252 are illustrated in FIG. 2A. In a variety of implementations, a LIDAR unit can be the highest point on a removable pod 252. Hardware housing 256 can protect various portions of removable pod 252 from weather elements such as rain, snow, wind, hot temperatures, cold temperatures, etc. A variety of shapes of hardware housing can be utilized in removable pod 252 in addition or alternatively to hardware housing 256 as illustrated in FIG. 2B. For example, hardware housing 256 can include two or more housing units to house separate portions of the removable pod 252 as well as a different shaped hardware housing 256.

In a variety of implementations, removable pod mount(s) 258 can attach removable pod 252 to a vehicle. Removable pod mount(s) 258 can be adjusted such that sensors within a removable pod 252 can collect data from a preferred defined position and/or location. For example, removable pod mount(s) 258 can be adjusted to compensate for different curvatures between different vehicles. Removable pod mount(s) 258 can attach removable pod 252 to a vehicle in a variety of ways including: suction cups, magnets, adhesives (e.g., glue, tape), etc. In some implementations, removable pod mount(s) 258 can be a single mount. Varying number of mounts can be included in removable pod 252 in accordance with various implementations. For example, removable pod 252 can include two removable pod mounts 258, three removable pod mounts 258, four removable pod mounts 258, etc. In many implementations, three removable pod mounts 258 can be arranged in a tripod style configuration.

Figure 2C:
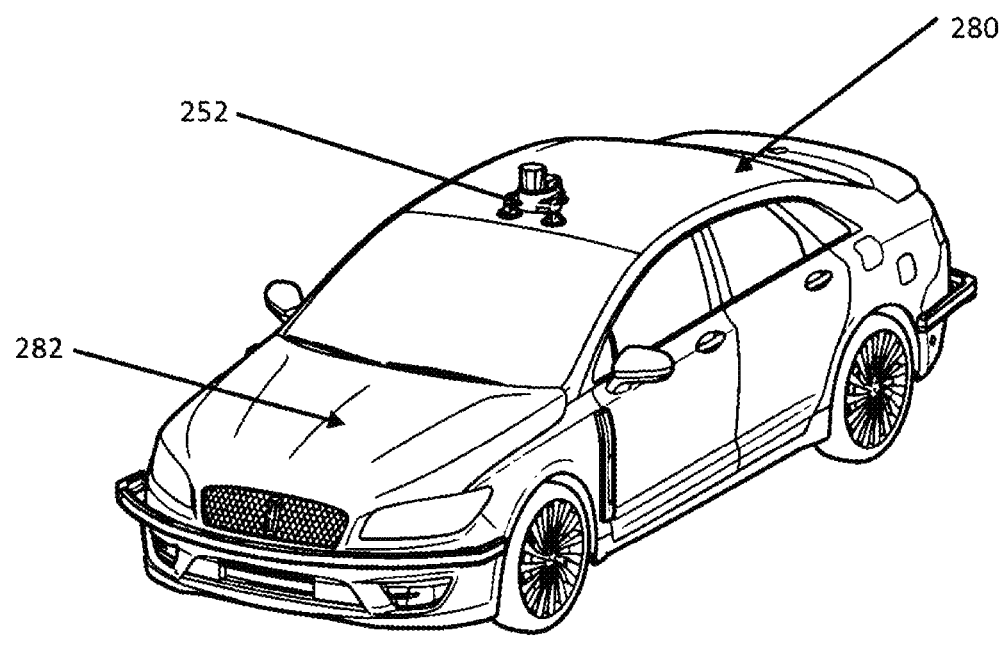
FIG. 2C illustrates an example removable hardware pod mounted onto a vehicle in which implementations herein may be implemented.

FIG. 2C illustrates an image of a removable pod mounted on a vehicle in accordance with implementations disclosed herein. Combined vehicle and pod 280 can include removable pod 252 mounted atop a vehicle 282 in a predefined preferred position. In a variety of implementations, removable pod 252 is vehicle agnostic and can be mounted on a variety of vehicles 282 including: cars, trucks, motorcycles, sports utility vehicles, vans, mopeds, tractor trailers, busses, motorized scooters, etc. In some implementations, components linked with removable pod 252 can be inside vehicle 282. For example, vehicle cabin removable pod hardware 216 (as illustrated in FIG. 2A) can be inside the vehicle. As a further example, vehicle cabin removable pod hardware 216 can be inside a car, sports utility vehicle, truck, bus, etc. In some such examples, a laptop computer can be utilized as computing device 222 in removable pod hardware 216, and the laptop computer can be stored inside the vehicle. In other implementations, a vehicle can lack an enclosed interior and vehicle cabin removable pod hardware can be stored "in" the vehicle in additional ways. For example, a motorcycle can utilize a cellular telephone computing device as computing device 222 in removable pod hardware 216. In some such examples, the motorcycle rider can carry the cellular telephone in a pocket. In implementations, the vehicle cabin removable pod hardware 216 can be combined with the external removable pod hardware. Alternatively, various portions of the external removable pod hardware 202 can be combine with selected portions of the vehicle cabin removable pod hardware 216.

In many implementations, several removable pods 252 can be mounted to vehicle 282 to increase the density of data collection. For example, a car can have a removable pod 252 mounted to its front right side and an additional removable pod 252 can be mounted to its front left side. As another example, a vehicle pulling a trailer can have a removable pod 252 mounted to the vehicle and a second removable pod 252 mounted to the trailer to capture, for example, additional data when the trailer moves in a different direction from the vehicle. As a further example, a bus can have three removable pods 252 mounted along the top to capture additional environmental data a single removable pod 252 could potentially miss because of the larger size of a bus when compared to a smaller vehicle such as a car. For example, line of sight perspectives of a pod on a larger vehicle could be restricted or even blocked due to the irregular shape of the vehicle, position of the pod or other reasons. Multiple pods on a vehicle may provide the ability to collect data from different perspectives, positions or obtain line of sight data not previously recordable. In some implementations, the removable pod is not connected to the vehicle control system of the vehicle to which the pod is mounted upon. In other words, the removable pod collects data and does not generate and/or send signals to control the vehicle.

Figure 3:
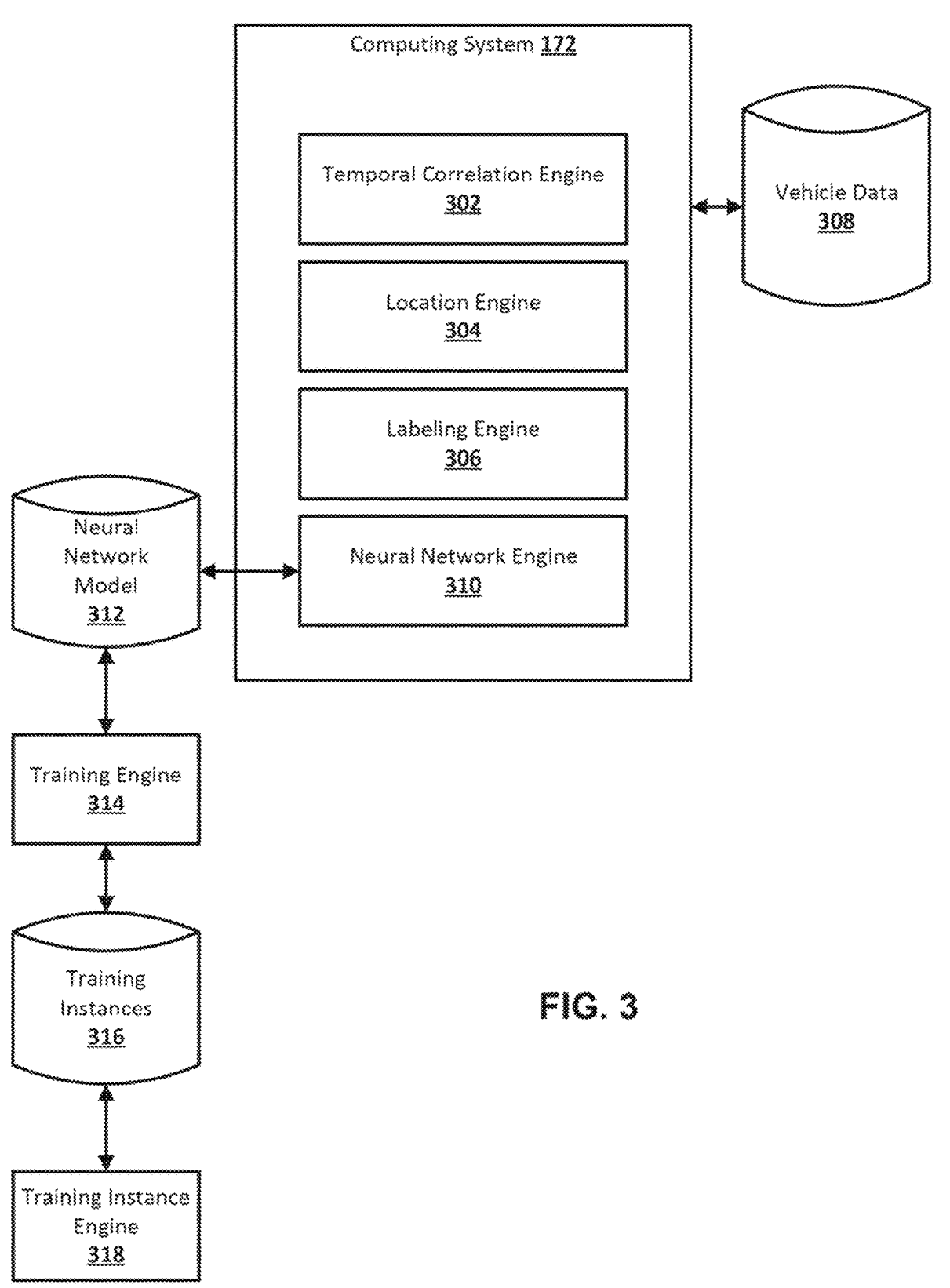
FIG. 3 illustrates an example computing system in which implementations disclosed herein may be implemented.

FIG. 3 is illustrates an example of a computing system for training a machine learning model such as a neural network model, in which implementations disclosed herein may be implemented. Computing system 172 can receive time stamped vehicle observations (i.e., a collection of vehicle data and/or environmental data collected by one or more autonomous vehicle(s) as well as one or more non-autonomous vehicle(s)) via network 170. In many implementations computing system 172 includes temporal correlation engine 302, location engine 304, labeling engine 306, neural network engine 310, training engine 314, and training instance engine 318. Temporal correlation engine 302, location engine 304, labeling engine 306, neural network engine 310, training engine 314, and training instance engine 318 are example components in which techniques described herein may be implemented and/or with which systems, components, and techniques described herein may interface. The operations performed by one or more engines 302, 304, 306, 310, 314, 318 of FIG. 3 may be distributed across multiple computing systems. In some implementations, one or more aspects of engines 302, 304, 306, 310, 314, 318 may be combined into a single system and/or one or more aspects may be implemented by computing system 172. For example, in some of those implementations, aspects of temporal correlation engine 302 may be combined with aspects of labeling engine 306. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

Computing system 172 can perform a variety of processing on vehicle data 308. In many implementations, vehicle data 308 includes time stamped autonomous vehicle data (as described herein with respect to FIG. 1) as well as time stamped additional vehicle data such as data collected using a removable hardware pod (as described herein with respect to FIG. 2A). Temporal correlation engine 302 can (if necessary) synchronize time stamps between sets of data collected by separate vehicles collecting data in the same environment. For example, vehicle data can be collected from an autonomous vehicle and a removable hardware pod 250 mounted on a non-autonomous vehicle 280 co-present in the same environment at the same time. While both vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

Location engine 304 can determine the proximity of vehicles within the environment (often at each time stamp) from vehicle data 308. In many implementations, the co-presence of vehicles can be determined using one or more proximity sensors within a vehicle. Location engine 304 can compare a signal generated by a proximity sensor in an autonomous vehicle with the signal generated by a proximity sensor in a removable hardware pod mounted on a non-autonomous vehicle to determine whether the autonomous vehicle and the non-autonomous vehicle are co-present in an environment. For example, signals from proximity sensors can indicate a non-autonomous vehicle is within twenty meters of an autonomous vehicle. In many implementations, signals from proximity sensors can indicate a wide variety of ranges including: not in range, within one meter, within five meters, within ten meters, within fifty meters, within one hundred meters, within two hundred meters, etc. In some such implementations, only vehicle data where vehicles are within a threshold level of proximity will be further processed (e.g., only data from vehicles within a two hundred fifty meter range will be additionally processed). Additionally or alternatively, vehicles can move in and out of a threshold range of proximity as they maneuver in the environment. For example, only data at time stamps where vehicles are in proximity range can be additionally processed. In some such implementations, portions of vehicle data where vehicles are not in proximity can be discarded.

Location engine 304 can additionally or alternatively determine vehicle locations using vehicle data 308. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using LIDAR data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data. Data collected by corresponding vehicle LIDAR units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some such implementations, an autonomous vehicle can determine its location on the same map, with respect to the same reference frame, and/or one or more additional methods of determining its location with respect to the same map as the additional vehicle.

Labeling engine 306 can generate labels (in some implementations automatically generate labels) for autonomous vehicle data using vehicle data collected from one or more additional vehicles, such as a non-autonomous vehicle equipped with a hardware pod 250. Computing system 172 can determine two vehicles are co-present in an environment using location engine 304. In some such implementations, labeling engine 306 can determine instances of autonomous vehicle data which only captures a single additional vehicle co-present in the environment (i.e., when the autonomous vehicle is known to be within a proximity range of an additional vehicle, and only one vehicle is captured in the autonomous vehicle data, generally the additional vehicle will be the vehicle captured in the autonomous vehicle data). Data collected from the additional vehicle can be mapped to the location of the additional vehicle in the instance of autonomous vehicle data at a common time stamp. For example, a brake light signal of non-autonomous vehicle can be collected via a CAN bus and time stamped by a removable pod computing device (such as computing device 222 as illustrated in FIG. 2). A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, labeling engine 306 can utilize locations of two vehicles determined by location engine 304 (e.g., locations determined using GPS data collected form each vehicle and/or by localizing each vehicle using a common landmark(s) in the environment). Similarly, additional data collected from the additional vehicle 280 can be mapped to its location in the autonomous vehicle data at corresponding time stamps.

Neural network engine 310 can train neural network model 312. Neural network model 312, in accordance with many implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, neural network model 312 can represent a variety of machine learning networks in addition to neural networks such as support vector machines, decision trees, Bayesian networks, other machine learning techniques, and/or combinations of machine learning techniques. Training neural network model 312 in accordance with many implementations described herein can utilize neural network engine 310, training engine 314, and training instance engine 318. Neural network models can be trained for a variety of autonomous vehicle tasks including determining a target autonomous vehicle location, generating one or more signals to control an autonomous vehicle, identifying objects within the environment of an autonomous vehicle, etc. For example, a neural network model can be trained to identify traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

Training instance engine 318 can generate training instances 316 to train the neural network model. A training instance 316 can include, for example, an instance of autonomous vehicle data where the autonomous vehicle can detect an additional vehicle using one or more sensors and a label corresponding to data collected from the additional vehicle. Training engine 314 applies a training instance as input to neural network model 312. In a variety of implementations, neural network model 312 can be trained using supervised learning, unsupervised learning, and semi-supervised learning. Additionally or alternatively, neural network models in accordance with some implementations can be deep learning networks including recurrent neural networks, convolutional neural networks, networks that are a combination of multiple networks, etc. For example, training engine 314 can generate predicted neural network model output by applying training input to the neural network model 312. Additionally or alternatively, training engine 314 can compare predicted neural network model output with neural network model known output from the training instance and, using the comparison, update one or more weights in neural network model 312 (e.g., backpropagate the difference over the entire neural network model 312). Generating training instances and using training instances to train a neural network model in accordance with many implementations is described herein in process 1000 of FIG. 10.

In many implementations, overfitting can occur when neural network model 312 is trained such that it too closely learns a particular set of training instances and therefore fails to respond well to unknown training instances. Overfitting can be prevented in autonomous vehicle data where sensors detect vehicles carrying removable hardware pod(s) in a variety of ways. For example, using a removable hardware pod of a variety of types of vehicles can generate a wider variety of data and, for example, can prevent a neural network model from learning how an autonomous vehicle interacts with only one type of non-autonomous vehicle. Additionally or alternatively, the removable hardware pod can be identified in autonomous vehicle data so the neural network model does not simply become good at recognizing hardware pods. For example, using a known dimensions of the non-autonomous vehicle and the position of the hardware pod on the non-autonomous vehicle, a precise bounding box can be drawn around the non-autonomous vehicle in the autonomous vehicle data which can exclude the hardware pod. Additionally or alternatively, one or more image processing techniques can be used to mask removable hardware pods out of autonomous vehicle data. Furthermore, since the location of the hardware pod is known, the area containing the hardware pod can be subtracted out of autonomous vehicle data and not used in training instances.

To further prevent overfitting in neural network models in accordance with many implementations, the location where a hardware pod is mounted on an non-autonomous vehicle can be varied, the shape of the hardware pods itself can be varied, the sensor suite of the hardware pod can be spread out over the vehicle (e.g., the hardware pod can be given tentacles to spread sensors out over the top of a vehicle, etc.). Additionally or alternatively, the LIDAR unit (i.e., the sensor which typically has the tallest profile in the hardware suite) can be moved inside the vehicle. Furthermore, in some implementations the LIDAR unit can be replaced with a camera. It can be more computationally intensive to perform common landmark based localization using only a camera, but as a tradeoff using only a camera can help prevent overfitting in the neural network model.

Figure 4:
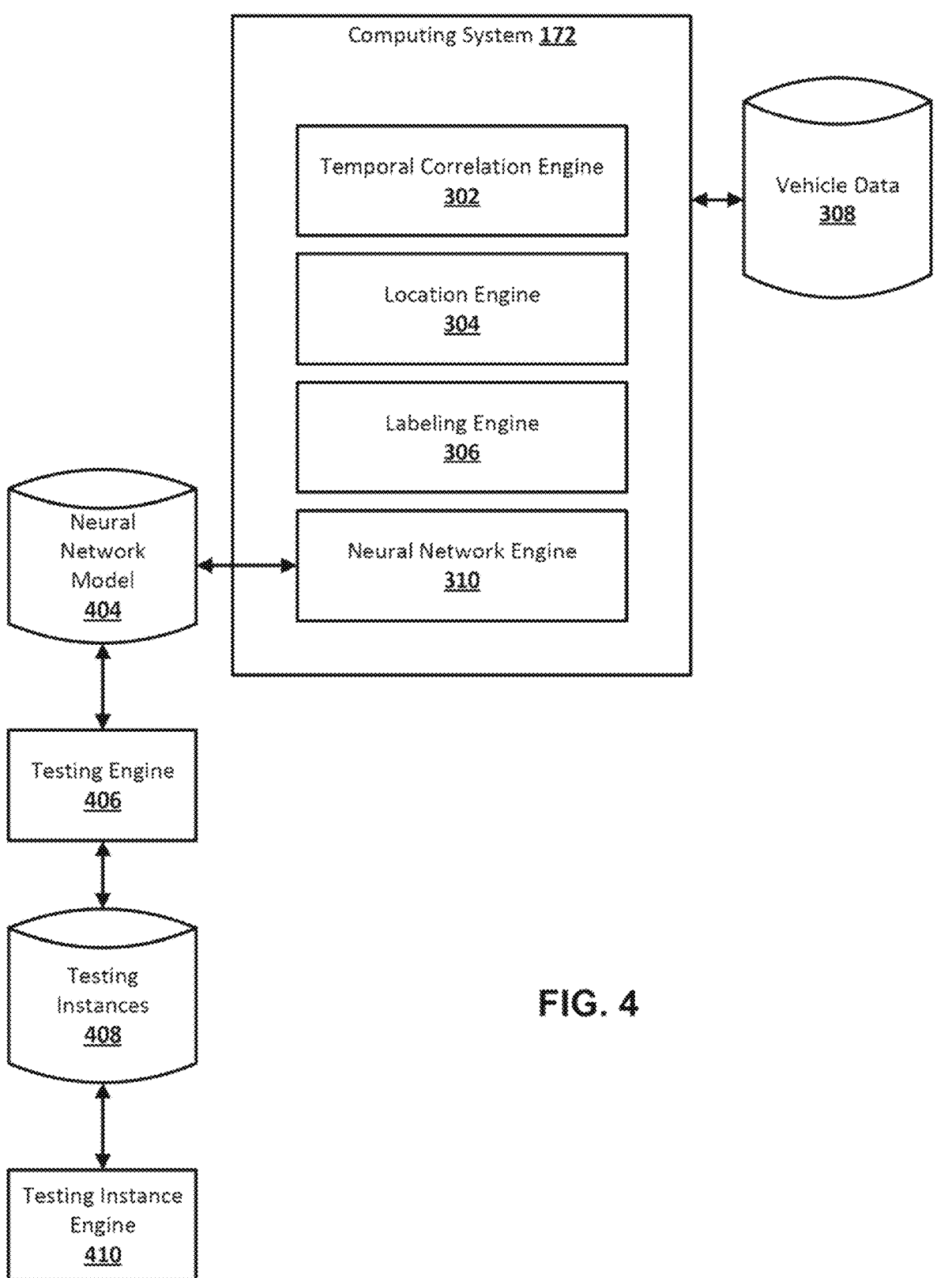
FIG. 4 illustrates another example of a computing system in which implementations disclosed herein may be implemented.

FIG. 4 illustrates another example of a computing system for testing a trained neural network model in which implementations disclosed herein may be implemented. Computing system 172, temporal correlation engine 302, location engine 304, labeling engine 306, and vehicle data 308 are described with respect to FIG. 3. Neural network engine 310, testing engine 406, and testing instance engine 410 in accordance with implementations can be utilized to generate testing instances for autonomous vehicle data including a label corresponding to an additional vehicle present in the autonomous vehicle data, as well as to test a trained neural network model 404. In some implementations, trained neural network model 404 can generate predicted output for a single autonomous vehicle task. In other implementations, trained neural network model 404 can generate predicted output for multiple autonomous vehicle tasks. Testing instance engine 410 can generate testing instances 408 using labeled autonomous vehicle data collected from an autonomous vehicle and an additional vehicle performing the specific autonomous vehicle task neural network model 404 is trained for.

A testing instance, for example, can include an instance of autonomous vehicle data where an additional vehicle is detected by one or more sensors of the autonomous vehicle, and a label corresponding to data collected by the additional vehicle. Testing engine 406 can apply a testing instance as input to neural network model 404. Predicted output generated by applying a testing instance to neural network model 404 can be compared with the known output for the testing instance (i.e., the label) to update an accuracy value (e.g., an accuracy percentage) for the neural network model.

Figure 5:
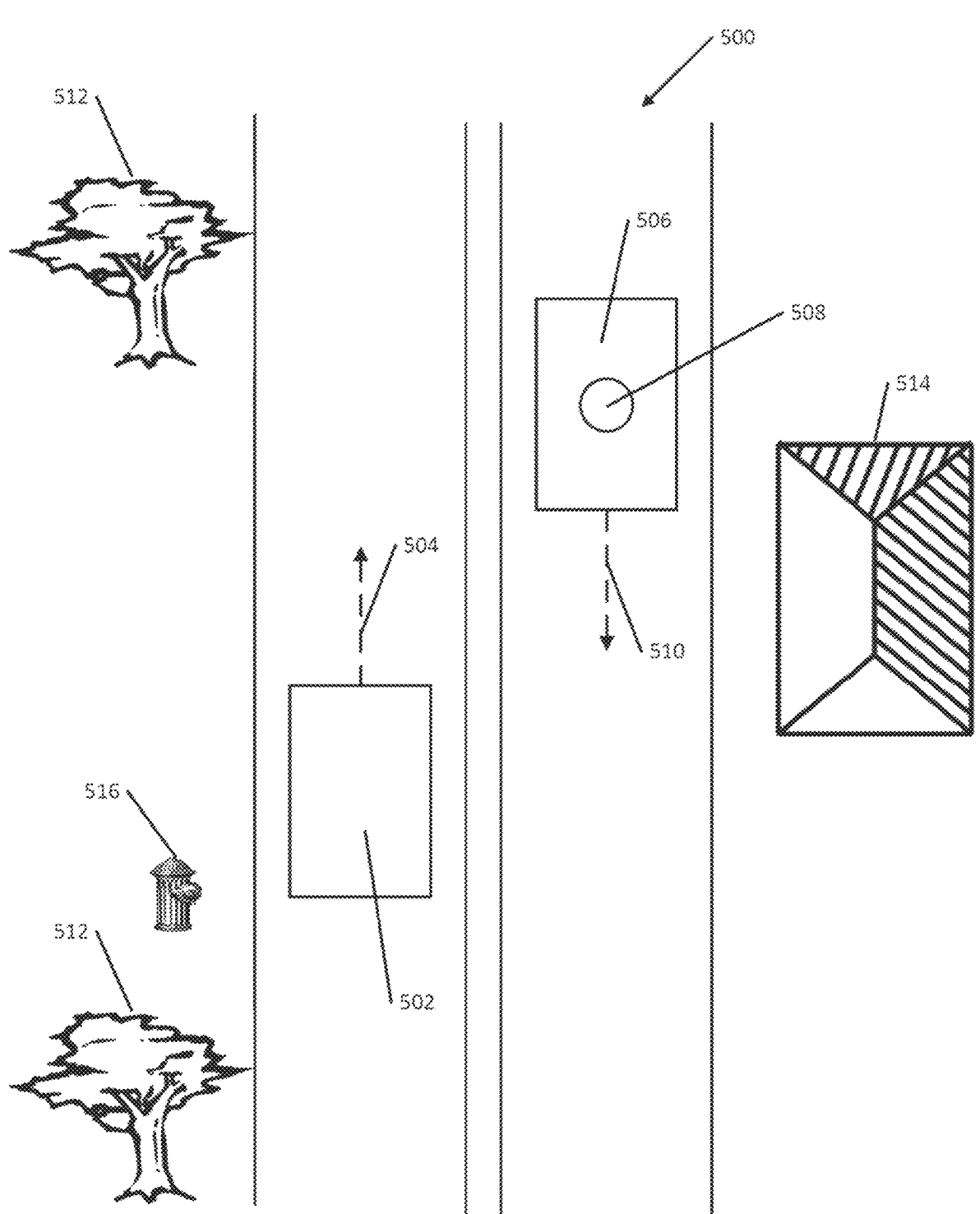
FIG. 5 illustrates an example image of an autonomous vehicle in an environment with a non-autonomous vehicle in which implementations disclosed herein may be implemented.

FIG. 5 illustrates an example autonomous vehicle and an example non-autonomous vehicle mounted with a removable hardware pod in accordance with implementations described herein. Image 500 includes a scene of autonomous vehicle 502, non-autonomous vehicle 506 mounted with removable hardware pod 508, as well as a variety of common landmarks 512, 514, and 516. Autonomous vehicle 502 is traveling in direction 504 on a road. Non-autonomous vehicle 506, which is traveling in direction 510 on the same road as autonomous vehicle 502. Vehicles 502 and 506 can travel in a variety of directions. For example, autonomous vehicle 504 and non-autonomous vehicle 506 are traveling in opposite directions towards one another in adjacent lanes in the road, where direction 504 is substantially parallel and opposite to direction 510. Furthermore, common landmarks in an environment with an autonomous vehicle and a non-autonomous vehicle can be used to localize the position of the vehicles. Common landmarks can include any of a variety of stationary objects detectable by both vehicles such as tree(s) 512, building(s) 514, fire hydrant(s) 516, etc. In many implementations, data collected by removable pod 508 can be mapped to data collected by autonomous vehicle 502 to label autonomous vehicle data. For example, the color of the non-autonomous vehicle can be mapped to the location of the non-autonomous vehicle in the autonomous vehicle data to generate a color label. As another example, the steering angle of the non-autonomous vehicle (collected via the CAN bus) at a specific time stamp can be mapped to the location of the non-autonomous vehicle in the autonomous vehicle data to generate a steering angle label.

Figure 6:
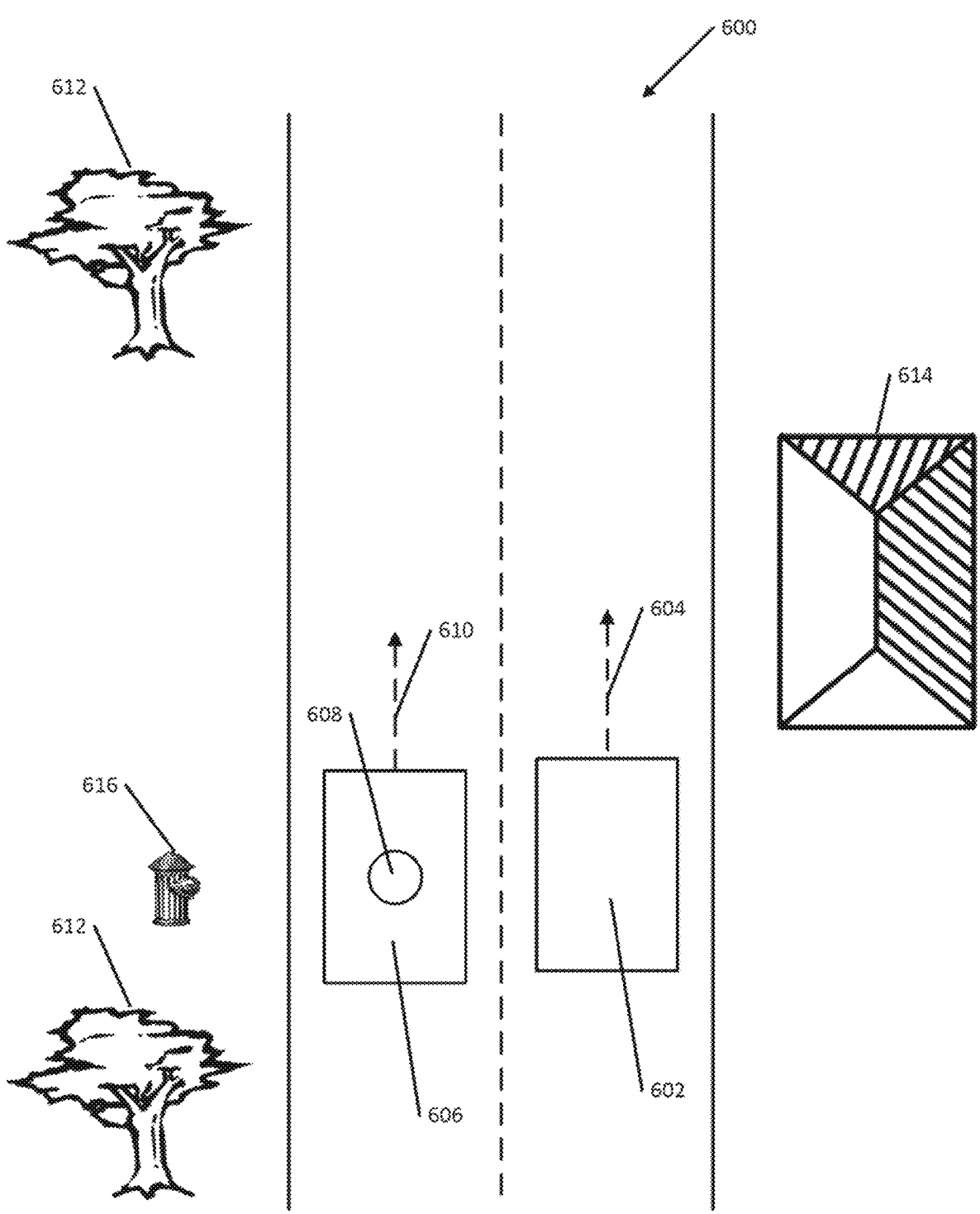
FIG. 6 illustrates another example image of an autonomous vehicle in an environment with a non-autonomous vehicle in which implementations disclosed herein may be implemented.

FIG. 6 illustrates another example autonomous vehicle and non-autonomous vehicle mounted with a removable hardware pod in accordance with implementations described herein. Image 600 includes a scene of autonomous vehicle 602 traveling in direction 604, non-autonomous vehicle 606 mounted with removable hardware pod 608 traveling in direction 610, as well as common landmarks 612, 614, and 616. For example, autonomous vehicle 602 and non-autonomous vehicle 606 are traveling in substantially the same direction in adjacent lanes on a road. Common landmarks can include: tree(s) 612, building(s) 614, fire hydrant 616, etc. In the illustrated example, non-autonomous vehicle 606 is between autonomous vehicle 602 and fire hydrant 616. In some such implementations, the view of fire hydrant 616 can be partially and/or fully occluded from autonomous vehicle 602 (i.e., one or more sensors in autonomous vehicle 602 cannot detect a portion and/or any of fire hydrant 616). While autonomous vehicle 602 cannot detect fire hydrant 616 at particular time stamps, data collected by removable pod 608 can be used, along with known locations of autonomous vehicle 602 and non-autonomous vehicle 606, to determine the distance from the autonomous vehicle to the fire hydrant. In other words, data collected by removable hardware pod 608 can extend the field of vision of autonomous vehicle 602 to objects outside of autonomous vehicle 602's direct line of sight. In some such implementations, the distance from an autonomous vehicle to an occluded object in the environment can be determined by calculating the distance of the autonomous vehicle to the non-autonomous vehicle using the autonomous vehicle data, the distance from the non-autonomous vehicle to the object using the additional vehicle data, and using the distance from the autonomous vehicle to the non-autonomous vehicle and the distance from the non-autonomous vehicle to the object to calculate the distance between the object and the autonomous vehicle.

Figure 7:
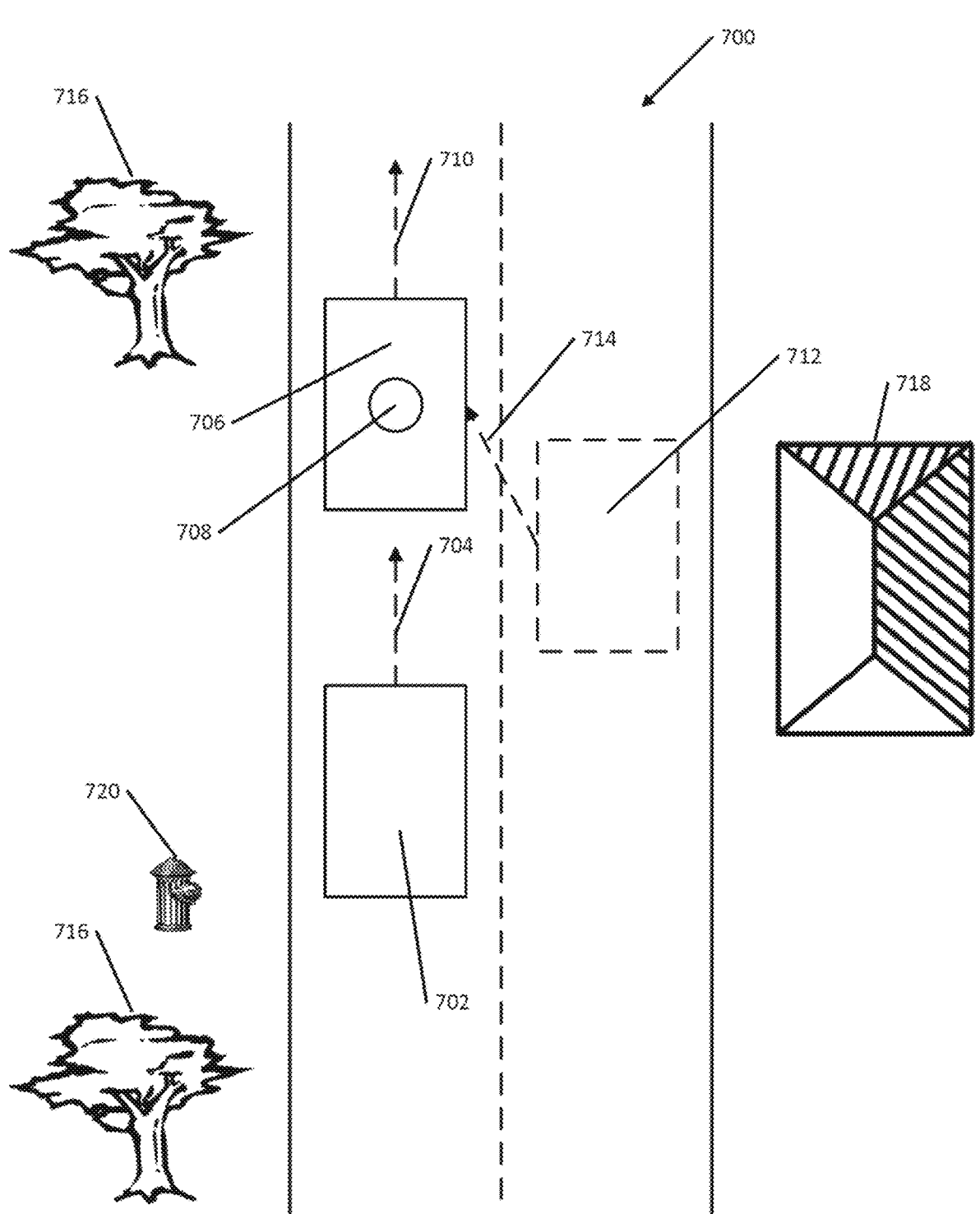
FIG. 7 illustrates another example image of an autonomous vehicle in an environment with a non-autonomous vehicle in which implementations disclosed herein may be implemented.

FIG. 7 illustrates another example autonomous vehicle and non-autonomous vehicle mounted with a removable hardware pod in accordance with implementations described herein. Image 700 includes a scene of autonomous vehicle 702 traveling in direction 704 and non-autonomous vehicle 706 mounted with removable hardware pod 708 traveling in direction 710, as well as common landmarks: tree(s) 716, building(s) 718, fire hydrant(s) 720, etc. Non-autonomous vehicle 706 is traveling in front of autonomous vehicle 702 in the same lane of a road.

Image 700 further illustrates a previous position 712 of the non-autonomous vehicle, where the non-autonomous vehicle has moved in a direction 714 from original position 712 (e.g., moving in direction 714 can cause the non-autonomous vehicle to change lanes and move into a position in front of the autonomous vehicle). In a variety of implementations, autonomous vehicles and/or non-autonomous vehicles can perform one or more autonomous vehicle tasks to generate labeled autonomous vehicle data which can be used as training instances (as described in FIG. 3) and/or testing instances (as described in FIG. 4) for a neural network model. Autonomous vehicle tasks can include a variety of task to control an autonomous vehicle, as well as enabling an autonomous vehicle to interact with its environment (e.g., collecting data about an environment, identifying objects within the environment, etc.). For example, an autonomous vehicle can learn how to interact with other vehicles driving in the same environment (such as non-autonomous vehicle 706 moving in the same lane in front of autonomous vehicle 702).

Labeled autonomous vehicle data in accordance with implementations described herein can, for example, train a neural network model to generate one or more control signals for how the autonomous vehicle should respond when another vehicle moves in front of it. As a further example, a car quickly moving in front of the autonomous vehicle with a minimal distance between it and the autonomous vehicle (i.e., the other vehicle cutting the autonomous vehicle off) might not happen as frequently (and thus can be considered an edge case). It can take many months to generate sufficient labeled autonomous vehicle data while waiting for an autonomous vehicle to be cut off by other vehicles organically. In many implementations, a non-autonomous vehicle equipped with a removable hardware pod can repeatedly cut off an autonomous vehicle. Sufficient labeled autonomous vehicle data for generating testing instances and/or training instances for a neural network model can be generated by the non-autonomous vehicle and autonomous vehicle in a matter of hours and/or days.

Figure 8:
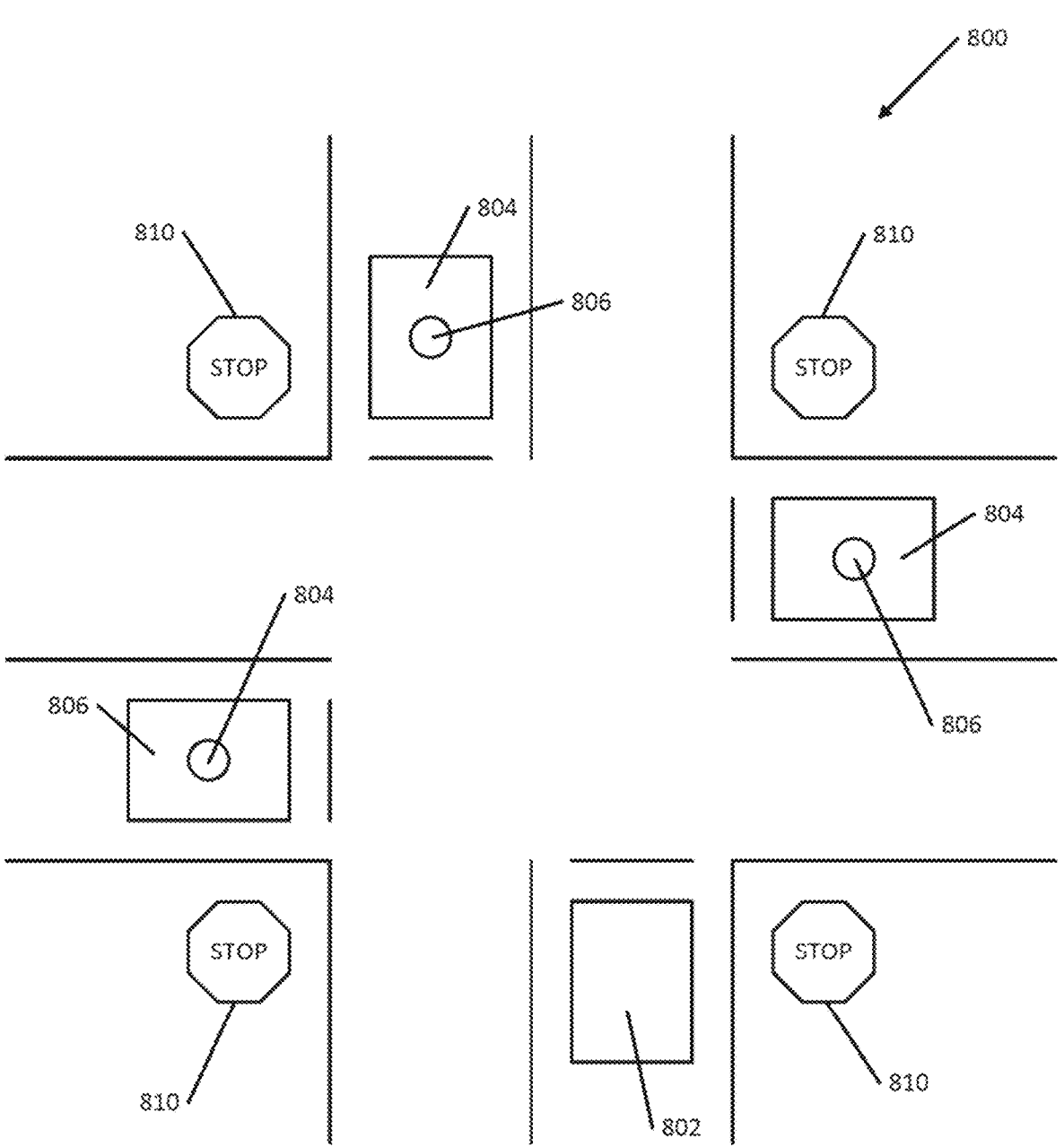
FIG. 8 illustrates an example image of an autonomous vehicle in an environment with multiple non-autonomous vehicles in which implementations disclosed herein may be implemented.

FIG. 8 illustrates an example autonomous vehicle and multiple non-autonomous vehicles mounted with a removable hardware pod in accordance with implementations described herein. Image 800 is a scene including autonomous vehicle 802 at one corner of a four way stop. Three non-autonomous vehicles 806, each mounted with a removable hardware pod 806 are stopped at the other corners of the four way stop. Additionally, image 800 includes four stop signs 810, one located at each corner of the four way stop. For example, autonomous vehicle data can be collected from the autonomous vehicle while additional vehicle data is collected for each of the non-autonomous vehicles using a removable pod. The brake lights of other cars at a four way stop are typically not in the field of view of an autonomous vehicle. Removable hardware pods can capture brake light data from the non-autonomous vehicle's via the non-autonomous vehicle's CAN busses, and a brake light signal indicating (e.g., indicating if a brake light is on or off) can be mapped to the non-autonomous vehicle in the in the autonomous vehicle data. In other words, removable hardware pods can expand the field of view of autonomous vehicle sensors, as well as quickly capture large amounts of data simultaneously in a scene.

As described above with respect to FIG. 7, autonomous vehicles can perform a variety of autonomous vehicle tasks including an autonomous vehicle interacting with other vehicles at a four way stop. In the present example, the three non-autonomous vehicles 806 can be located in the data collected by autonomous vehicle 802. In accordance with implementations described herein, data collected from a removable hardware pod 804 can be mapped to the location of the corresponding non-autonomous vehicle in the autonomous vehicle data at specific time stamps. Removable hardware pods 804 can collect a variety of data including data generally inaccessible to an autonomous vehicle (e.g., data collected from a non-autonomous vehicle CAN bus). This additional data can be used to create more robust training instances and/or testing instances for autonomous vehicle neural network models in accordance with many implementations. Additionally or alternatively, multiple additional vehicles collecting data in the same environment as an autonomous vehicle can quickly collect a wide diversity of data. In some implementations, additional vehicle data can be mapped to the autonomous vehicle data to extend the range of vision of the autonomous vehicle. For example, additional vehicle data collected from a non-autonomous vehicle in front of the autonomous vehicle can include information outside of the range of view of the autonomous vehicle's sensors. This data collected by the non-autonomous vehicle beyond the field of view of the autonomous vehicle can be mapped to the data collected by the autonomous vehicle, thus increasing the range of data collected for use in training the autonomous vehicle.

Figure 9:
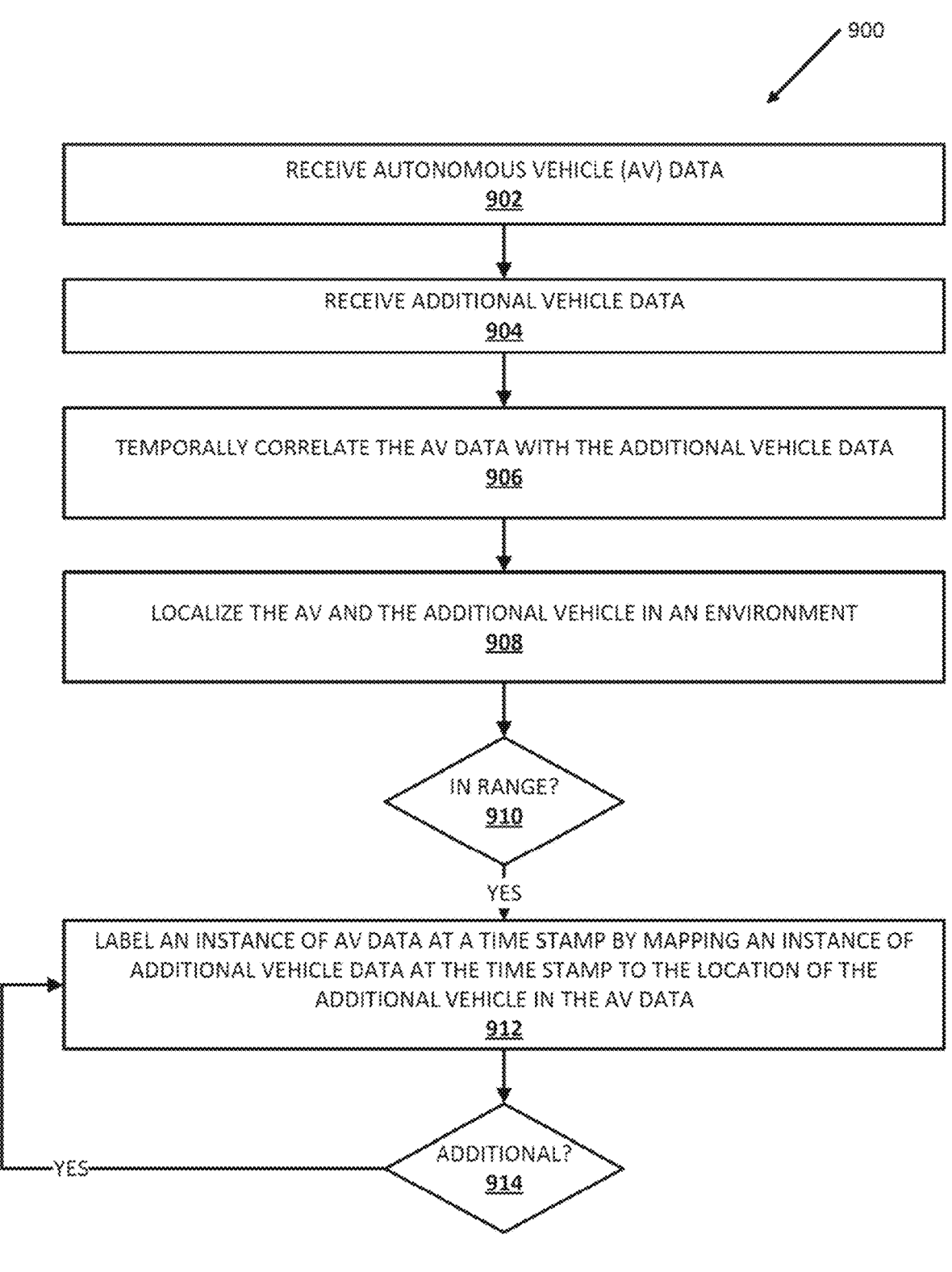
FIG. 9 is a flowchart illustrating an example process of performing selected aspects of the present disclosure, in accordance with various implementations.

Referring to FIG. 9, an example process 900 for practicing selected aspects of the present disclosure in accordance with various implementations is disclosed. For convenience, the operations of the flowchart are described with reference to a system that performs the operations. This system may include various components of various devices, including those described in FIGS. 1-4. Moreover, while operations of process 900 are shown in a particular order, this is not meant to be limiting. One or more operations, elements, and/or steps may be reordered, omitted, and/or added.

At block 902, the system receives autonomous vehicle data. Autonomous vehicle data can be collected from one or more autonomous vehicle sensors 130 (as illustrated in FIG. 1) and can include vision data such as LIDAR data and/or an image from a camera. In some such implementations, the additional vehicle as viewed by the autonomous vehicle is present in the vision data.

At block 904, the system receives additional vehicle data. In some implementations additional vehicle data can be collected from a second autonomous vehicle sensor suite in a second autonomous vehicle. In other implementations, vehicle data can be collected from a removable hardware pod mounted on a non-autonomous vehicle (as illustrated in FIGS. 2A-2C).

At block 906, the system temporally correlates the autonomous vehicle data with the additional vehicle data for vehicles in the same environment. For example, data sets collected at the same time in the same environment can have different time stamps. The time stamp in one (or more) data sets can be shifted to correspond with a particular data set (e.g., shift one or more data sets corresponding to additional vehicles such that the additional vehicle data set(s) match up with the data set for an autonomous vehicle). Temporal correlation engine 302 (as illustrated in FIG. 3 and FIG. 4) can temporally correlate autonomous vehicle data with additional vehicle data.

At block 908, the system localizes the autonomous vehicle and the additional vehicle in an environment. In many implementations, a system can determine if two vehicles are co-present in an environment in post processing using signals collected from one or more proximity sensors in each vehicle. Additionally or alternatively, GPS data in the autonomous vehicle data can localize the autonomous vehicle at each time stamp. Similarly, GPS data in the additional vehicle data can localize the autonomous vehicle at each time stamp. Furthermore, a common landmark can be found at the same time stamp in autonomous vehicle data and additional vehicle data. A distance from the common landmark to each vehicle can be determined using each vehicles corresponding LIDAR data. The distance between the autonomous vehicle and the additional vehicle can be calculated using the distance of each vehicle to the common landmark. Location engine 304 (as illustrated in FIG. 3 and FIG. 4) can localize an autonomous vehicle and at least one additional vehicle within an environment.

At block 910, the system determines whether the autonomous vehicle and the at least one additional vehicle are in range of each other using determinations made by the system in block 908. For example, one or more proximity sensors can indicate two vehicles are within range of each other. Additionally or alternatively, proximity sensor(s) can indicate two vehicles are not within range of each other. In many implementations, the location of the autonomous vehicle and the additional vehicle can be used to determine if the two vehicles are in range of each other. For example, in many implementations the distance between the two vehicles is two hundred fifty meters or less to be considered in range of each other. In various implementations, a system can determine two vehicles are in range by finding an instance of the additional vehicle with the removable hardware pod in the vision data of the autonomous vehicle.

At block 912, the system labels an instance of autonomous vehicle data at a time stamp by mapping additional vehicle data at the time stamp to the location of the additional vehicle in the autonomous vehicle data. In some implementations, labeled autonomous vehicle data can be automatically generated. Labeling engine 306 (as illustrated in FIG. 3 and FIG. 4) can label autonomous vehicle data in accordance with many implementations. Labels can include a variety of information about the additional vehicle including both static and dynamic information. Static information can be collected from a user, for example while a user is calibrating the position of a removable hardware pod while mounting the removable hardware pod on a vehicle, and can include known information about the additional vehicle such as the vehicle make, model, color, dimensions, position of the mounted removable hardware pod, etc. Similarly, dynamic information can change at different times and can include a variety of information including LIDAR point cloud data at a specific time, an image captured by a camera, 3D positioning information, data from the IMU, as well as real time vehicle information collected from the additional vehicle CAN bus such as vehicle velocity, one or more steering control signals, brake light status, etc. In many implementations, a label in autonomous vehicle data can be utilized in training a neural network model as a known output of the instance of the autonomous vehicle data. In some implementations, an individual instance of autonomous vehicle data can have many labels, each indicating a separate property of the additional vehicle captured in the instance of autonomous vehicle data. In other implementations, a label can contain a multitude of information captured by the additional vehicle. Additionally or alternatively, data collected from multiple additional vehicles can be used to generate labels in a single instance of autonomous vehicle data.

At block 914, the system determines whether any additional instances of autonomous vehicle data still need to be labeled. If so, the system proceeds back to block 912, and labels an additional instance of vehicle data. Autonomous vehicle data labeled in accordance with process 900 can be used to generate training data and/or testing data for a neural network model.

Referring to FIG. 10, an example process 1000 for practicing selected aspects of the present disclosure in accordance with various implementations is disclosed. For convenience, the operations of the flowchart are described with reference to a system that performs the operations. This system may include various components of various devices, including those described in FIGS. 1-4. Moreover, while operations of process 1000 are shown in a particular order, this is not meant to be limiting. One or more operations, elements, and/or steps may be reordered, omitted, and/or added.

At block 1002, the system generates neural network model training instances from labeled autonomous vehicle data where each training instance includes an instance of autonomous vehicle data and a corresponding label. In many implementations, labels can be generated using data from an additional vehicle. In some such implementations, labeled autonomous vehicle data can be generated in accordance with process 900 described herein. Furthermore, the autonomous data portion of the training instance can be used as input to the neural network model and the label can be used as known output for the training input.

At block 1004, the system selects training instance generated at block 1002.

At block 1006, the system applies the autonomous vehicle data portion of the training instances as input to a neural network model to generate predicted output. In many implementations, the neural network model can generate predictive output for one or more autonomous vehicle tasks.

At block 1008, the system updates the neural network model based on the predicted output generated by the autonomous data portion of the training instance and the training instance label (i.e., the label is known output for the autonomous data). For example, the system can determine an error based on the predicted output and the label of the training instance, and backpropagate the error over the neural network model to update one or more weights of the neural network model.

At block 1010, the system determines whether there are one or more additional training instances. If so, the system proceeds back to block 1004, selects an additional training instance, then performs blocks 1006 and 1008 based on the additional unprocessed training instance. In some implementations, at block 1010 the system may determine not to process any additional unprocessed training instances if one or more training criteria has been satisfied (e.g., a threshold number of epochs have occurred, a threshold duration of training has occurred, and/or all training instances have been processed). Although process 1000 is described with respect to a non-batch learning technique, batch learning may additionally and/or alternatively be utilized.

Figure 11:
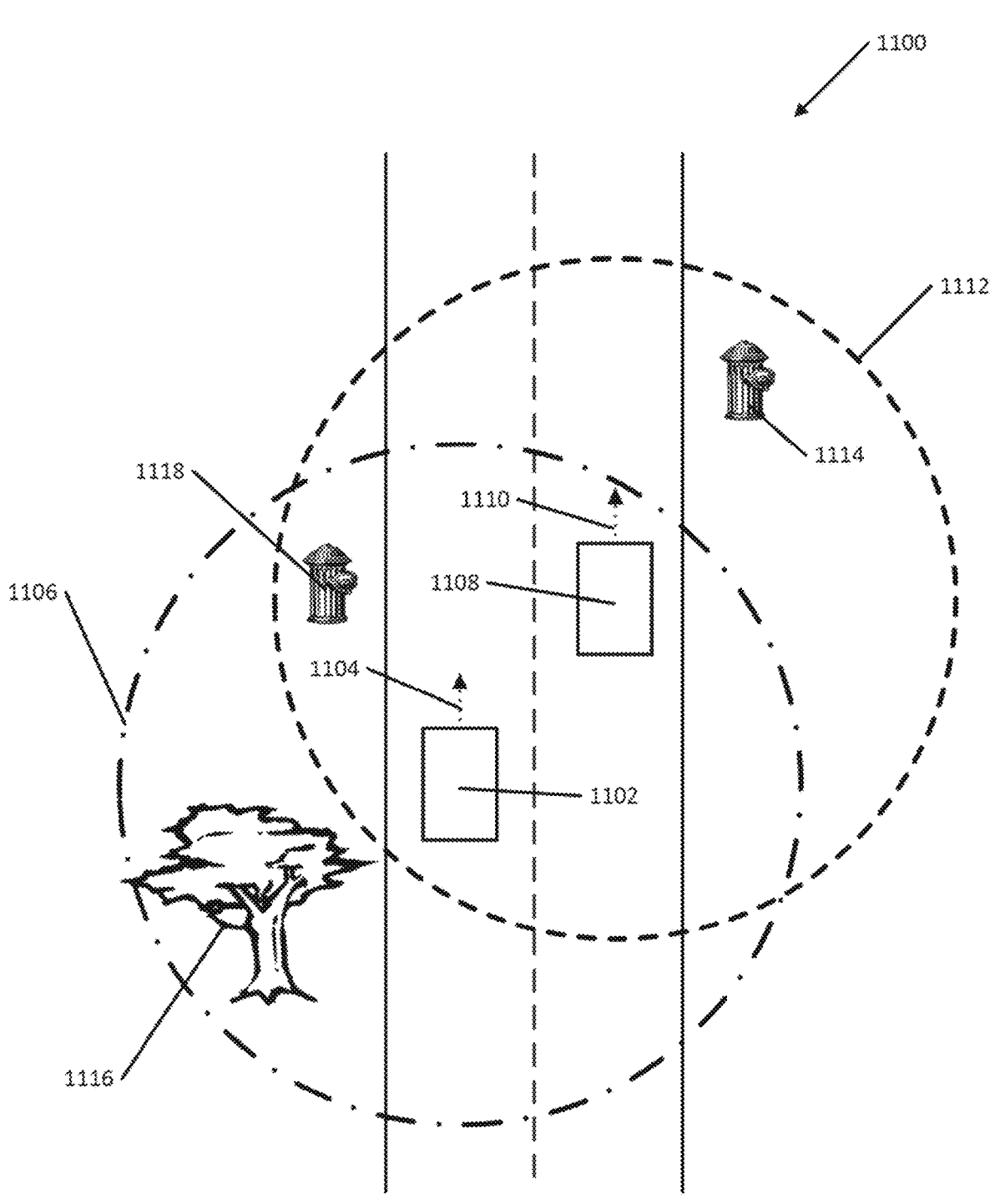
FIG. 11 illustrates an example image of an autonomous vehicle in an environment with an additional vehicle in which implementations disclosed herein may be implemented.

FIG. 11 illustrates an example autonomous vehicle and an example additional vehicle in accordance with implementations described herein. Image 1100 includes a scene of autonomous vehicle 1102, additional vehicle 1108, as well as a variety of environmental objects 1114, 1116, and 1118. Autonomous vehicle 1102 is traveling in direction 1104 on a road. The sensor range of sensor(s) in the autonomous vehicle sensor suite is represented by dashed line 1106. Additional vehicle 1108 is traveling in direction 1110 on the same road as autonomous vehicle 1102, and the range of sensor(s) in the additional vehicle sensor suite is represented by dashed line 1112. In some implementations, additional vehicle 1108 can be a non-autonomous vehicle equipped with a removable pod (not depicted). Common landmarks in an environment can be used to localize the position of the vehicles. Common landmarks can include any of a variety of environmental objects 1114, 1116, 1118 such as stationary objects (fire hydrants, trees, buildings, traffic signs, traffic signals, and/or additional stationary objects) and/or dynamic objects (additional vehicles, bicycles, pedestrians, pets, and/or additional dynamic objects). Additional or alternative environmental objects may be present. Furthermore, sensor data, such as GPS data, can be used to localize vehicle(s) in the environment.

In some implementations, sensor range 1106 of the autonomous vehicle overlaps with sensor range 1112 of the additional vehicle. For example, environmental object 1118 is within the sensor rage of both vehicles 1102 and 1108 (i.e., sensor range 1106 as well as sensor range 1112). The sensor range of one vehicle can capture the other vehicle (i.e., sensor range of 1106 of the autonomous vehicle captures additional vehicle 1108, and sensor range 1112 of the additional vehicle captures autonomous vehicle 1102). In some implementations, object(s) can be within the sensor range of one vehicle and not the other vehicle. For example, object 1116 is within sensor range 1106 of vehicle 1102 and is not within sensor range 1112 of vehicle 1108. Object 1114 is within sensor range 1112 of vehicle 1108 and is not within sensor range 1106 of vehicle 1102.

Objects captured in sensor data can be labeled. In some implementations, object(s) captured in sensor data can be manually labeled (e.g., labeled by a human), automatically labeled (e.g., labeled using one or more machine learning models), labeled automatically and verified manually (e.g., labeled using machine learning model(s) and verification of those labels by a human), and/or labeled using additional methodologies of label generation. For example, object 1116 can be labeled as a tree, object 1118 can be labeled as a fire hydrant, and object 1114 can be labeled as a fire hydrant. Labels can include information including object type, object location relative to the corresponding vehicle, date and/or time the sensor data was captured, and/or additional information relating to the object and/or the vehicle capturing the sensor data. For example, object 1118 can be labeled as a fire hydrant in a supervised manner (e.g., labeled by a human reviewer), labeled in a semi-supervised manner (e.g., labeled by a computing system and verified by a human reviewer), and/or labeled in an unsupervised manner (e.g., labeled by a computing system). In some of implementations, a label corresponding to an object captured in sensor data of a first vehicle can be used to label the same object captured in sensor data of a second vehicle. For example, object 1118 can be labeled as a fire hydrant object type in an instance of sensor data captured by additional vehicle 1108.

In some implementations, objects which are automatically labeled may be automatically labeled by the AV system. For example, the AV control subsystem may include a perception system (or an alternative AV system or subsystem) which applies labels to objects within the sensor field of view. The object labels that are applied by the AV control subsystem may be transferred to a second vehicle sensor suite data stream to be applied as noted in the various embodiments herein. In some implementations, the labels that are automatically generated by the perception system of an AV may be transferred to another vehicle within the vicinity of the AV, wherein the AV sensor suite has overlapping sensor fields of view as another vehicle. Additionally or alternatively, the sensor data and labels generated by an AV within the vicinity of a second AV may be transferred to the second AV to extend the sensor range of the second AV. For example, a sensor suite for a first AV may be in the vicinity of a second AV and may detect an object which is on the horizon of the perception field of the second AV. The perception system of the first AV may appropriately identify and label the object while the object is too far away for the sensor suite of the second AV to be identified. A data package from the first AV may be sent to the second AV identifying the position of the first AV and position of the identified object. In some implementations, the second AV may receive the data package, transpose the orientation information of the first AV and the object to an appropriate mapping (through an appropriate transformation from a first pose to a second pose) and position the object with a label within its perception field.

Additionally or alternatively, automatic labeling of objects may be applied to occluded objects that are not perceived by the second AV and/or considered a high priority. For example, a first AV may be in the same vicinity as a second AV and detect a pedestrian. Detection of a pedestrian may be considered a high priority object detection causing the first AV to transmit a data package to any nearby AV as to the detection and location of the pedestrian. A second AV may be in the same area but the pedestrian is not detectable or is occluded form the sensor field of view, by for example another car. The second AV may receive the priority data package from the first AV and label the object as to where the pedestrian should be within the field of view so that that AV control system operates the vehicle in a manner as to recognize the pedestrian.

In some implementations, objects labeled in a first instance of sensor data captured by additional vehicle 1108 can be automatically mapped to label objects in a second instance of sensor data captured by autonomous vehicle 1102. In some of those implementations, object labels may automatically be mapped by determining a physical correlation between the instances of sensor data. In other words, both instances of sensor data need to capture a labeled object before the label can automatically be mapped to the second instance of sensor data. Additionally or alternatively, object labels may automatically be mapped by determining a physical correlation as well as a temporal correlation between the instances of sensor data. In other words, the both instances of sensor data need to capture a labeled object at the same (or substantially similar) time before the label can automatically be mapped to the second instance of sensor data. The location of the labeled object can be identified in the first instance of sensor data. For example, a group of points in LIDAR point cloud data corresponding to the labeled object can be identified, a group of pixels in an image corresponding to the labeled object can be identified, and/or the labeled object can be identified in additional sensor data. A transformation can be determined between the location of the first vehicle, the location of the second vehicle, and the location of the object in the first instance of sensor data. This determined transformation can be used to determine the location of the object in the second instance of sensor data. The label of the object from the first instance of sensor data can then be mapped to the second instance of sensor data by mapping the object label to the location of the object in the second instance of sensor data.

For example, an instance of sensor data can include an instance of point cloud data captured using a LIDAR sensor of the sensor suite of autonomous vehicle 1102. Similarly, an additional instance of sensor data can include an additional instance of point cloud data captured using a LIDAR sensor of the sensor suite of the additional vehicle 1108. One or more objects, such as fire hydrant 1118, can be labeled in the additional instance of point cloud data captured using the sensor suite of additional vehicle 1108. In some implementations, the location of fire hydrant 1118 in the additional instance of sensor data (e.g., one or more points in the additional instance of point cloud data corresponding to the object) can be mapped to the corresponding location in the instance of sensor data captured using the sensor suite of autonomous vehicle 1102 (e.g., one or more point in the instance of point cloud data corresponding to the object). For example, a transformation can be determined from the pose of additional vehicle 1108 (e.g., the location and/or orientation of additional vehicle 1108) to a global coordinate system. In some implementations, the location of object 1118 (e.g., one or more points in the additional point cloud) can be transformed to the global coordinate system using this transformation. Similarly, an additional transformation can be determined from the pose of autonomous vehicle 1118 to the global coordinate system. The transformed location of object 1118 (i.e., the location of object 1118 with respect to the global coordinate system) can be transformed using the additional transformation to determine the location of object 1118 in the instance of sensor data captured using the sensor suite of autonomous vehicle 1102 (e.g., one or more points in the instance of point cloud data).

In some implementations, the label corresponding to object 1118 in the instance of sensor data captured using the sensor suite of additional vehicle 1108 can be mapped to the determined location of the object in the instance of sensor data captured using autonomous vehicle 1102 (e.g., the label can be mapped to one or more points in the instance of point cloud data). In other words, an object can be labeled in a first instance of sensor data. The location of that object can be determined (e.g., using one or more transformation) in a second instance of sensor data, and the corresponding label can be mapped to the location of the object in the second instance of sensor data. Additional and/or alternative transformations can be utilized to determine the location of a labeled object in an additional instance of sensor data including a transformation from the pose of additional vehicle 1108 to a coordinate system of autonomous vehicle 1102, a transformation from the pose of autonomous vehicle 1102 to a coordinate system of additional vehicle 1108, etc.

In some implementations, an instance of sensor data can include an image captured using a camera of a sensor suite. One or more pixels in the image corresponding to an object can be labeled in the instance of sensor data. The location of the object (e.g., the one or more pixels corresponding to the object) can be determined in an additional instance of sensor data captured using a camera of an additional sensor suite. In some implementations, the object label can be mapped to the determined location of the object in the additional instance of sensor data (e.g., one or more pixels corresponding to the object in the additional instance of sensor data).

In some implementations, an object label can be mapped to additional instances of sensor data (e.g., two additional instances of sensor data, three additional instances of sensor data, four additional instances of sensor data, etc.). Additionally or alternatively, objects can be labeled in an instance of sensor data (e.g., two objects are labeled, three objects are labeled, four objects are labeled, etc.), and one or more of the labeled objects can be mapped to label the corresponding object(s) in additional instance(s) of sensor data.

In some implementations, the sensor suite of autonomous vehicle 1102 and the sensor suite of additional vehicle 1108 can include different versions of sensor suite hardware. For example, the sensor suite of autonomous vehicle 1102 can utilize sensor suite hardware version 1.0 and the sensor suite of additional vehicle 1108 can utilize sensor suite hardware version 2.0, where version 2.0 of the sensor suite hardware can capture more accurate and/or more precise sensor data. In some such implementations, sensor data captured using the sensor suite of the additional vehicle 1108 utilizing version 2.0 of the sensor suite hardware can be prioritized by a computing system. For example, the system can prioritize a label for an environmental object captured using sensor suite hardware version 2.0 of additional vehicle 1108 (i.e., the more accurate label, the more precise label, etc.) over a label for the same environmental object captured using sensor suite hardware version 1.0 of autonomous vehicle 1102. In some implementations, a system (e.g., the vehicle control system 120 illustrated in FIG. 1) can assign weight(s) to respective sensor data captured using different senor suites, and can determine label(s) based on the weight(s). For example, the system can assign a higher weight to sensor data captured using a newer version of a sensor suite than sensor data captured using an older version of a sensor suite.

In some implementations, the sensor suite of autonomous vehicle 1102 can utilize a different version of the sensor suite software than the sensor suite of additional vehicle 1108. As a further example, the sensor suite of autonomous vehicle 1102 can utilize sensor suite software version 3.4 and additional vehicle 1108 can utilize sensor suite software version 3.3, where sensor suite software version 3.4 is newer than sensor suite software version 3.3. In a variety of implementations, a computing system generating labeled data can prioritize sensor data captured via a sensor suite using a newer version of the sensor suite software. In some implementations, a system (e.g., the vehicle control system 120 illustrated in FIG. 1) can assign weight(s) to respective sensor data captured using sensor suites utilizing different software versions, and can determine label(s) based on the weight(s). For example, the system can assign a higher weight to sensor data captured using a sensor suite using a newer version of sensor suite software than sensor data captured using a sensor suite with an older version of sensor suite software.

Figure 12:
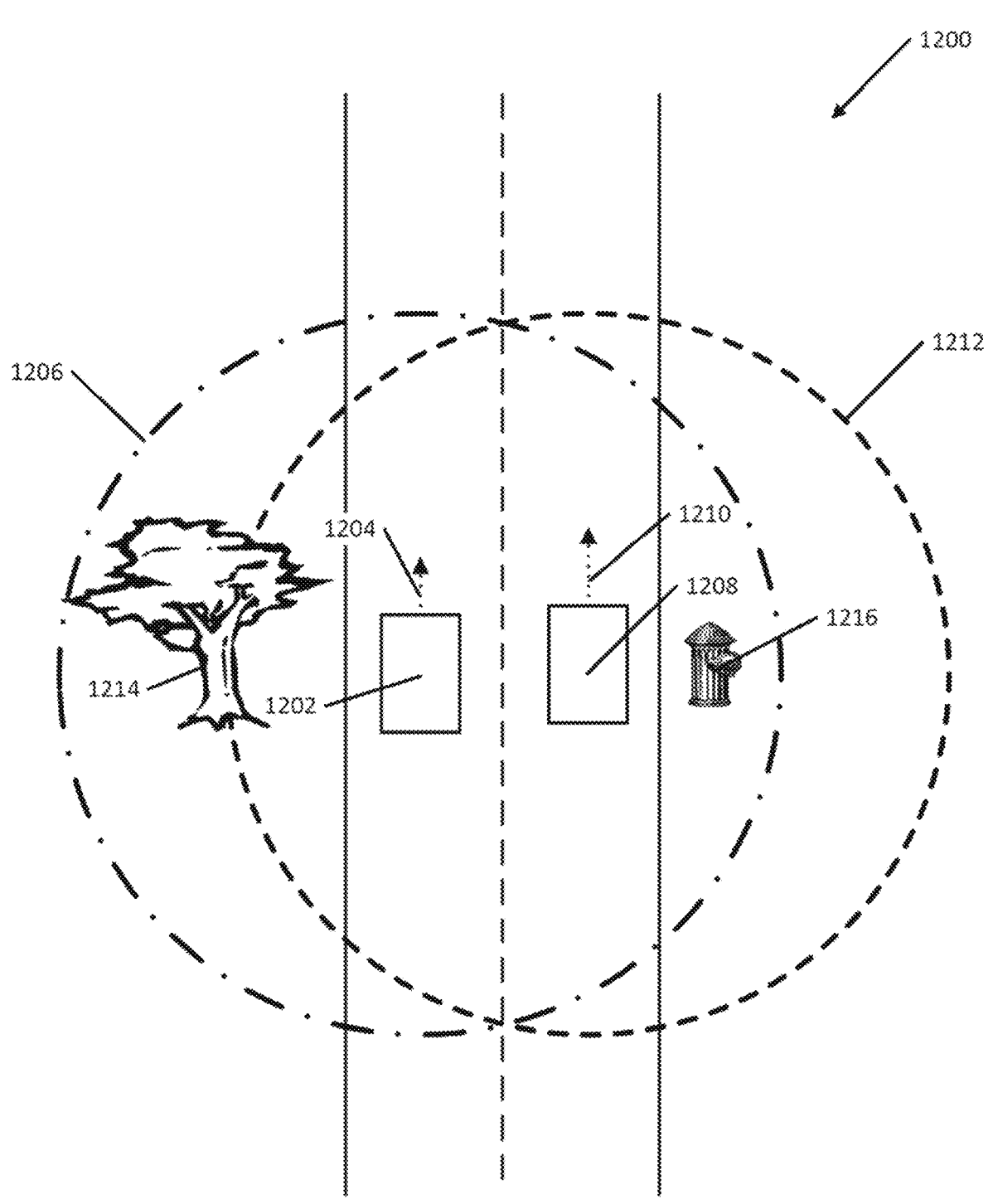
FIG. 12 illustrates another example of example image of an autonomous vehicle in an environment with an additional vehicle in which implementations disclosed herein may be implemented.

FIG. 12 illustrates an additional autonomous vehicle and additional vehicle in accordance with implementations described herein. Image 1200 includes a scene of autonomous vehicle 1202, additional vehicle 1208, as well as a variety of environmental objects 1214, and 1216. Autonomous vehicle 1202 is traveling in direction 1204 on a road. The sensor range 1206 of sensor(s) in the autonomous vehicle sensor suite is represented by a dashed line. Additional vehicle 1208 is traveling in direction 1210 on the same road as autonomous vehicle 1202. The sensor range 1212 of sensor(s) in the additional vehicle sensor suite is represented by a dotted/dashed line. In a variety of implementations, additional vehicle 1208 is an additional autonomous vehicle. Additionally or alternatively, additional vehicle 1208 is a non-autonomous vehicle equipped with a removable hardware pod (not depicted). As illustrated, autonomous vehicle 1202 is traveling in a direction 1204 which is substantially parallel to the direction 1210 of additional vehicle 1208. Autonomous vehicle 1202 and/or additional vehicle 1208 can travel in a variety of additional and/or alternative directions (not depicted).

In the illustrated example, additional vehicle 1208 is between autonomous vehicle 1202 and object 1216. In some such implementations, the view of object 1216 can be partially and/or fully occluded from autonomous vehicle 1202. In other words, one or more sensors of autonomous vehicle 1202 cannot detect a portion and/or any of object 1216 at one or more time stamps. Similarly, the view of object 1214 can be partially and/or fully occluded from additional vehicle 1208. While the illustrated example depicts an object being occluded by a vehicle, the object can be occluded by a variety of items in the environment including a pedestrian, a traffic light, a tree, a mail box, a building, and/or additional or alternative things in the environment preventing a sensor suite of a vehicle from capturing all of or a portion of an object at a given time step. In some implementations, labeled objects captured in sensor data of one vehicle can be used to label objects fully and/or partially occluded in a corresponding instance of sensor data captured by another vehicle.

For example, object 1216, which is occluded in sensor data captured by autonomous vehicle 1202, can be labeled in an instance of sensor data captured using the sensor suite of vehicle 1208. An additional instance of sensor data can be captured using the sensor suite of autonomous vehicle 1202. However, in the illustrated example, object 1216 is fully occluded by vehicle 1208, thus object 1216 is not captured by sensor(s) of the sensor suite of autonomous vehicle 1202. For example, object 1216 is not captured in point cloud data by a LIDAR sensor of the sensor suite of autonomous vehicle 1202. However, as described above with respect to FIG. 11, a transformation can be determined using the pose of vehicle 1202 and the pose of vehicle 1216 to determine the location of object 1216 with respect to autonomous vehicle 1202 (e.g., one or more predicted points in a point cloud corresponding to object 1216 which could be captured using the sensor suite of autonomous vehicle 1202 if object 1216 was not occluded by vehicle 1208). The label corresponding to object 1216 in the instance of sensor data can be mapped to the location of object 1216 in the additional instance of sensor data (e.g., the predicted position in the additional instance of sensor data that is not captured in the additional instance of sensor data due to the occlusion). In some implementations, the range of the sensor suite of a vehicle, such as autonomous vehicle 1202, can be extended to include labeled objects not captured and/or partially captured in the environment. Such extension to include labeled objects not captured and/or partially captured may include real time sensor suite extension as noted herein.

As described above with reference to FIG. 11, a system such as vehicle control system 120 illustrated in FIG. 1, can prioritize sensor data captured using a sensor suite with a version of sensor suite hardware and/or software over sensor data captured using an additional sensor suite with an additional version of sensor suite hardware and/or software (e.g., the system can prioritize a newer version of the sensor suite hardware and/or software over an older version of the sensor suite hardware and/or software). In some implementations, the system can assign respective weight(s) to sensor data from different version(s) of sensor suite hardware and/or software. Additionally or alternatively, the system can determine label(s) based on these weight(s).

Additionally or alternatively, the system such as vehicle control system 120 illustrated in FIG. 1, can prioritize sensor data captured using a sensor suite with importance of object detection. For example, upon detection of a class of objects, the vehicle control system may prioritize the labeling and transmission of the labeling to other AVs.

Figure 13:
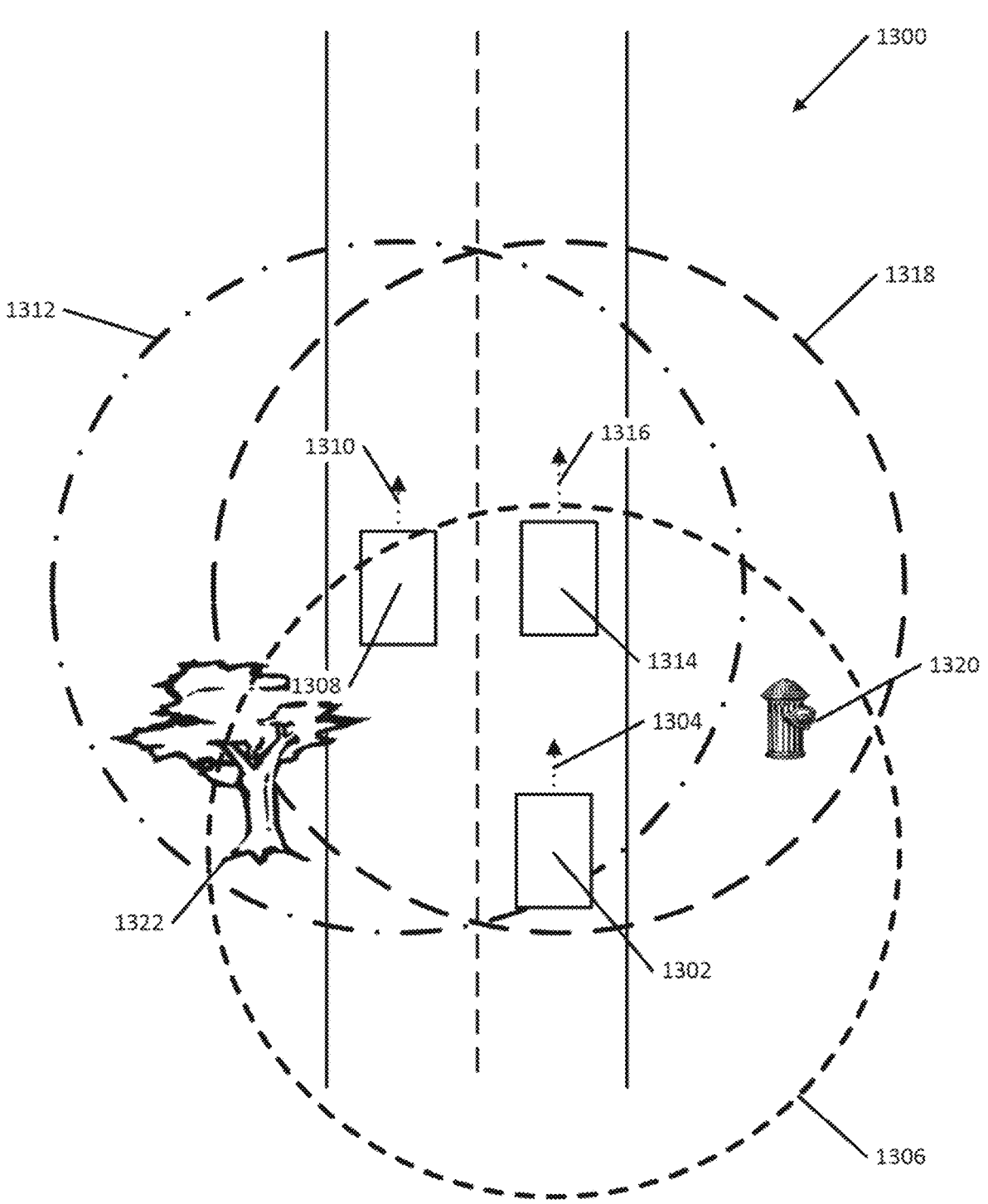
FIG. 13 illustrates an example of an autonomous vehicle in an environment with multiple additional vehicles in which implementations disclosed herein may be implemented.

FIG. 13 illustrates an autonomous vehicle and two additional vehicles in accordance with implementations described herein. Image 1300 includes a scene autonomous vehicle 1302, first additional vehicle 1308, second additional vehicle 1314, as well as a variety of environmental objects 1320 and 1322. Autonomous vehicle 1302 is traveling in direction 1304 on a road. The sensor range 1306 of autonomous vehicle 1302 is represented by a dashed line. First additional vehicle 1308 is traveling in direction 1310 along the same road, and the range of sensor(s) in the first additional vehicle sensor suite is represented by dot-dashed line 1312. Furthermore, second additional vehicle 1314 is traveling in direction in 1316 along the same road, and the sensor suite range of the second additional vehicle is represented by long-dashed line 1318. In some implementations, first additional vehicle 1308 and/or second additional vehicle 1314 are additional autonomous vehicle(s). Additionally or alternatively, first additional vehicle 1308 and/or second additional vehicle 1312 are non-autonomous vehicle(s) equipped with removable hardware pod(s) (not depicted).

In the illustrated example, sensor data collected using the sensor suite of autonomous vehicle 1302 can be labeled by mapping labeled sensor data collected by the first additional vehicle 1308 as well as the second additional vehicle 1314. For example, object 1322 is within the sensor range 1312 of first additional vehicle 1308, and object 1322 is within the sensor range 1306 of the first additional vehicle. As described above with respect to FIG. 11 and/or FIG. 12, a label corresponding to object 1322 in an instance of sensor data captured by the sensor suite of first additional vehicle 1308 can be mapped to label object 1322 in sensor data collected by autonomous vehicle 1302. Similarly, object 1320 is within the sensor range 1318 of second additional vehicle 1314, and object 1320 is within the sensor range of autonomous vehicle 1302. A label corresponding to object 1320 in an instance of sensor data collected by the sensor suite of second additional vehicle 1314 can be mapped to label 1320 in sensor data collected by autonomous vehicle 1302.

In some implementations, a first vehicle can communicate with a second vehicle utilizing a variety of communication channels. For example, autonomous vehicle 1302 can transmit sensor data to a remote computing system (e.g., a remote server). In some implementations, first additional vehicle 1308 can transmit additional sensor data to the remote computing system, and the remote computing system can determine timestamps for the sensor data, can localize objects in the sensor data, can map labels from the first set of sensor data to the second set of sensor data, and/or can perform additional and/or alternative calculations using the sensor data.

Additionally or alternatively, calculations can be performed on sensor data using one or more processors local to one or more vehicles. As an example, first additional vehicle 1308 can transmit sensor data to the remote computing system and the remote computing system can transmit the sensor data captured using the sensor suite of first additional vehicle 1308 to second additional vehicle 1314. Additionally or alternatively, first additional vehicle 1308 can transmit sensor data directly to second additional vehicle 1314. In some implementations, one or more calculations can be performed on the sensor data captured using the sensor suite of first additional vehicle 1308 using one or more processors of second additional vehicle 1314. For example, a timestamp corresponding with an instance of sensor data captured using the sensor suite of first additional vehicle 1308 can be determined using processor(s) of second additional vehicle 1314.

Referring to FIG. 14, an example process 1400 for practicing selected aspects of the present disclosure in accordance with various implementations is disclosed. For convenience, the operations of the flowchart are described with reference to a system that performs the operations. This system may include various components of various devices, including those described in FIGS. 1-4. Moreover, while operations of process 1400 are shown in a particular order, this is not meant to be limiting. One or more operations, elements, and/or steps may be reordered, omitted, and/or added.

At block 1402, the system receives autonomous vehicle data. For example, the system can receive instances of sensor data captured by one or more sensors of the autonomous vehicle sensor suite. In some implementations, sensor data can include 3D positioning sensor data (e.g., GPS data), RADAR data, LIDAR data, IMU data, images captured by one or more camera(s), and/or additional sensor data captured by a sensor suite of an autonomous vehicle.

At block 1404, the system receives labeled additional vehicle data. In some implementations, the additional vehicle can be an additional autonomous vehicle, and the additional vehicle data can be captured using the sensor suite of the additional autonomous vehicle. In some other implementations, the additional vehicle data can be data captured using a removable hardware pod, and can include IMU data, 3D positioning sensor data, images captured by one or more cameras, LIDAR data, and/or additional sensor data captured by one or more removable hardware pods. An instance of the additional vehicle data can include one or more labeled objects. Object labels can include a variety of information including: the location of the object, the classification of the object, and/or additional information about the object in the environment. For example, an object label can indicate the object is a tree, the distance of the tree with respect to the additional vehicle, the 3D positioning data of the additional vehicle, and a timestamp corresponding to the time the sensor data was captured. The label can include additional and/or alternatively information in accordance with some implementations. Object label(s) can be generated in a supervised manner, a semi-supervised manner, and/or in an unsupervised manner.

At block 1406, the system correlates one or more instances of the autonomous vehicle data with one or more instances of the labeled additional vehicle data. In some implementations, the labeled additional vehicle data can be temporally correlated and physically correlated with the autonomous vehicle data. Additionally or alternatively, the autonomous vehicle and the additional vehicle(s) can be localized within an environment (i.e., physically correlated) without temporal correlation. For example, an additional vehicle can capture sensor data driving down Main Street on Monday, which can be labeled. An autonomous vehicle can capture sensor data driving down Main Street the following Friday. Since the sensor data captured by both vehicles captures the same location (i.e., driving down Main Street), labeled object(s) in instance(s) of sensor data captured by the additional vehicle on Monday can be mapped to instance(s) of sensor data captured by the autonomous vehicle captured on Friday, despite the instance(s) of sensor data being captured at different times. In some implementations, the system can determine if two (or more) vehicles are co-present in an environment in post processing using GPS data localizing each vehicle at each time stamp. Additionally or alternatively, the system may utilize a separate mapping system to determine if two (or more) vehicles are co-present in an environment in post processing. For example, location and/or mapping data may be utilized in the captured sensor data and recorded. Post processing of the data may be utilize a mapping location system to determine co-location of two (or more) vehicles within the map by comparison of map coordinates. Since the sensor data captured by both vehicles captures the same location, labeled objects in instances of sensor data captured by the additional vehicle can be mapped to instances of sensor data captured by the autonomous vehicle. In implementations, the data captured from any similar sensor data suite may be utilized and the use of particular types of vehicles is not necessary as the mapping may be accomplished on the basis of post-processing determination of similar locations mapping labeled data to another collected sensor data stream.

At block 1408, the system determines the location of object(s) in the autonomous vehicle data (e.g., one or more points in a point cloud corresponding to the object(s), one or more pixels in an image corresponding to the object(s), etc. captured in an instance of sensor data using the sensor suite of the autonomous vehicle) using the location of the same object(s) in the labeled vehicle data (e.g., one or more points in a point cloud corresponding to the object, one or more pixels in an image corresponding to the object, etc. captured in an instance of sensor data using the sensor suite of the additional vehicle). In some implementations, the system determines location of object(s) in the autonomous vehicle data and the location of the same object(s) in the additional vehicle data with respect to a common coordinate system. In other words, autonomous vehicle data is transformed to a common coordinate system (e.g., a common world map), and additional vehicle data is transformed to the same common coordinate system. Additionally or alternatively, data captured using the sensor suite of one vehicle can be transformed to a coordinate system of a second vehicle. For example, autonomous vehicle data can be transformed to the coordinate system of the additional vehicle data. Determining the location of object(s) in instance(s) of sensor data in accordance with some implementations is described above with respect to FIG. 11, FIG. 12, and/or FIG. 13.

At block 1410, the system generates label(s) for object(s) in the autonomous vehicle data by mapping the label corresponding to the same object(s) in the labeled additional vehicle data. For example, the location of the object(s) determined at block 1408 in an instance of the labeled additional vehicle data (e.g., one or more points in a point cloud corresponding to the object(s), one or more pixels in an image corresponding to the object(s), etc. captured in the instance of sensor data using the sensor suite of the additional vehicle) can be mapped to the location of the object(s) determined at block 1408 in an instance of autonomous vehicle data (e.g., one or more points in a point cloud corresponding to the object(s), one or more pixels in an image corresponding to the object(s), etc. captured in an instance of sensor data using the sensor suite of the autonomous vehicle). Generating label(s) for object(s) in instance(s) of sensor data in accordance with some implementations is described above with respect to FIG. 11, FIG. 12, and/or FIG. 13.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed:

1. A method implemented at a remote computing system for generating labeled sensor data for training a machine learning model of an autonomous vehicle, the method comprising:

receiving first sensor data collected using a first vehicle sensor suite of a first vehicle, wherein the first sensor data comprises first vehicle time stamps and wherein at least a portion of the first sensor data comprises a representation of an additional object in an environment, wherein one or more first vehicle time stamps are respectively added to the one or more instances of first sensor data prior to the one or more instances of first sensor data being uploaded for further processing;

receiving second sensor data collected using a second vehicle sensor suite of a second vehicle, wherein the second sensor data comprises second vehicle time stamps;

temporally correlating one or more instances of the first sensor data with one or more instances of second sensor data using the first vehicle time stamps and the second vehicle time stamps;

generating a label for the first sensor data that identifies a current state of at least one attribute of the additional object, that is at least partially occluded in the first sensor data, determined using the one or more instances of second sensor data temporally correlated with the one or more instances of first sensor data;

processing, using the machine learning model, the first sensor data to generate a predicted label that is predicted to identify the current state of the at least one attribute of the additional object; and updating, based on a difference between the label and the predicted label, one or more weights of the machine learning model.

2. The method of claim 1, wherein:

the first vehicle is an autonomous vehicle, the second vehicle is a non-autonomous vehicle, and the second vehicle sensor suite is a removable hardware pod.

3. The method of claim 1, wherein:

one or more second vehicle time stamps are respectively added to the one or more instances of second sensor data prior to the one or more instances of second sensor data being uploaded for further processing.

4. The method of claim 1, wherein the second vehicle is captured in the one or more instances of first sensor data.

5. The method of claim 1, wherein:

the first sensor data is time stamped using a printed circuit board (PCB) and/or a computing device coupled to the first vehicle sensor suite.

6. The method of claim 1, wherein:

the second sensor data is time stamped using a PCB or computing device coupled to the second vehicle sensor suite, and/or using a sensor within the second vehicle sensor suite.

7. A remote system comprising one or more processors and a memory operably coupled with the one or more processors, wherein the memory stores instructions that, in response to execution of the instructions by the one or more processors, cause the one or more processors to perform a method comprising:

receiving first sensor data collected using a first vehicle sensor suite of a first vehicle, wherein the first sensor data comprises first vehicle time stamps and wherein at least a portion of the first sensor data comprises a representation of an additional object in an environment, wherein one or more first vehicle time stamps are respectively added to the one or more instances of first sensor data prior to the one or more instances of first sensor data being uploaded for further processing;

receiving second sensor data collected using a second vehicle sensor suite of a second vehicle, wherein the second sensor data comprises second vehicle time stamps;

temporally correlating one or more instances of the first sensor data with one or more instances of second sensor data using the first vehicle time stamps and the second vehicle time stamps;

generating a label for the first sensor data that identifies a current state of at least one attribute of the additional object, that is at least partially occluded in the first sensor data, determined using the one or more instances of second sensor data temporally correlated with the one or more instances of first sensor data;

processing, using a machine learning model, the first sensor data to generate a predicted label that is predicted to identify the current state of the at least one attribute of the additional object; and updating, based on a difference between the label and the predicted label, one or more weights of the machine learning model.

8. The remote system of claim 7, wherein:

the first vehicle is an autonomous vehicle, the second vehicle is a non-autonomous vehicle, and the second vehicle sensor suite is a removable hardware pod.

9. The remote system of claim 7, wherein:

one or more second vehicle time stamps are respectively added to the one or more instances of second sensor data prior to the one or more instances of second sensor data being uploaded for further processing.

10. The remote system of claim 7, wherein the second vehicle is captured in the one or more instances of first sensor data.

11. The remote system of claim 7, wherein:

the first sensor data is time stamped using a printed circuit board (PCB) and/or a computing device coupled to the first vehicle sensor suite.

12. The remote system of claim 7, wherein:

the second sensor data is time stamped using a PCB or computing device coupled to the second vehicle sensor suite, and/or using a sensor within the second vehicle sensor suite.

13. A non-transitory computer readable storage medium comprising instructions that, when executed by one or more processors, cause the one or more processors to perform a method at a remote computing system, the method comprising:

receiving first sensor data collected using a first vehicle sensor suite of a first vehicle, wherein the first sensor data comprises first vehicle time stamps and wherein at least a portion of the first sensor data comprises a representation of an additional object in an environment, wherein one or more first vehicle time stamps are respectively added to the one or more instances of first sensor data prior to the one or more instances of first sensor data being uploaded for further processing;

receiving second sensor data collected using a second vehicle sensor suite of a second vehicle, wherein the second sensor data comprises second vehicle time stamps;

temporally correlating one or more instances of the first sensor data with one or more instances of second sensor data using the first vehicle time stamps and the second vehicle time stamps;

generating a label for the first sensor data that identifies a current state of at least one attribute of the additional object, that is at least partially occluded in the first sensor data, determined using the one or more instances of second sensor data temporally correlated with the one or more instances of first sensor data;

processing, using a machine learning model, the first sensor data to generate a predicted label that is predicted to identify the current state of the at least one attribute of the additional object; and updating, based on a difference between the label and the predicted label, one or more weights of the machine learning model.

14. The non-transitory computer readable storage medium of claim 13, wherein:

the first vehicle is an autonomous vehicle, the second vehicle is a non-autonomous vehicle, and the second vehicle sensor suite is a removable hardware pod.

15. The non-transitory computer readable storage medium of claim 13, wherein:

one or more second vehicle time stamps are respectively added to the one or more instances of second sensor data prior to the one or more instances of second sensor data being uploaded for further processing.

16. The non-transitory computer readable storage medium of claim 13, wherein the second vehicle is captured in the one or more instances of first sensor data.

17. The non-transitory computer readable storage medium of claim 13, wherein:

the first sensor data is time stamped using a printed circuit board (PCB) and/or a computing device coupled to the first vehicle sensor suite.

18. The non-transitory computer readable storage medium of claim 13, wherein:

the second sensor data is time stamped using a PCB or computing device coupled to the second vehicle sensor suite, and/or using a sensor within the second vehicle sensor suite.

* * * * *